(12) United States Patent
Furukawa et al.

(10) Patent No.: US 10,526,007 B2
(45) Date of Patent: Jan. 7, 2020

(54) POWER CONVERSION DEVICE, CONTROL METHOD FOR SAME, AND ELECTRIC POWER STEERING CONTROL DEVICE

(71) Applicant: Mitsubishi Electric Corporation, Tokyo (JP)

(72) Inventors: Akira Furukawa, Tokyo (JP); Tatsuya Mori, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 61 days.

(21) Appl. No.: 15/506,907

(22) PCT Filed: Oct. 8, 2014

(86) PCT No.: PCT/JP2014/076935
§ 371 (c)(1),
(2) Date: Feb. 27, 2017

(87) PCT Pub. No.: WO2016/056082
PCT Pub. Date: Apr. 14, 2016

(65) Prior Publication Data
US 2017/0274926 A1    Sep. 28, 2017

(51) Int. Cl.
*B62D 5/04* (2006.01)
*H02P 6/28* (2016.01)
(Continued)

(52) U.S. Cl.
CPC ............... *B62D 5/046* (2013.01); *H02P 6/28* (2016.02); *H02P 27/085* (2013.01); *H02P 27/14* (2013.01)

(58) Field of Classification Search
CPC .. H02P 6/28; H02P 21/08; H02P 27/04; H02P 27/085; H02P 27/14
See application file for complete search history.

(56) References Cited

U.S. PATENT DOCUMENTS 7,173,393 B2 *   2/2007   Maeda ............. H02M 7/53873
                                                    318/400.02
8,907,611 B2 *  12/2014   Qin ........................ H02P 27/08
                                                    318/400.02
(Continued)

FOREIGN PATENT DOCUMENTS

EP    1898518 A2    3/2008
EP    2192683 A2    6/2010
(Continued)

OTHER PUBLICATIONS

International Search Report for PCT/JP2014/076935 dated Nov. 4, 2014 [PCT/ISA/210].

(Continued)

*Primary Examiner* — Eduardo Colon Santana
*Assistant Examiner* — Said Bouziane
(74) *Attorney, Agent, or Firm* — Sughrue Mion, PLLC; Richard C. Turner

(57) ABSTRACT

Provided is a power conversion device for suppressing a variation amount of a bus current to decrease a power loss in consideration of control of detecting the bus current during operation. In control by a power conversion part in accordance with a switching signal, a voltage vector is caused to bring a mode into a power running mode at a timing of detecting the bus current when an AC rotating machine is in a power running operation state, and the voltage vector is caused to bring the mode into a regeneration mode at a timing of detecting the bus current when the AC rotating machine is in a regeneration operation state, thereby decreasing the power loss due to the variation in the bus current.

19 Claims, 32 Drawing Sheets

(51) Int. Cl.
*H02P 27/08* (2006.01)
*H02P 27/14* (2006.01)

(56) References Cited

U.S. PATENT DOCUMENTS

| | | |
|---|---|---|
| 2003/0142517 A1 | 7/2003 | Furukawa et al. |
| 2013/0314013 A1 | 11/2013 | Ajima et al. |
| 2014/0035491 A1 | 2/2014 | Mukai et al. |

FOREIGN PATENT DOCUMENTS

| | | |
|---|---|---|
| JP | 2007-112416 A | 5/2007 |
| JP | 2011-015472 A | 1/2011 |
| JP | 2011-166904 A | 8/2011 |
| JP | 2013-247754 A | 12/2013 |

OTHER PUBLICATIONS

Written Opinion for PCT/JP2014/076935 dated Nov. 4, 2014 [PCT/ISA/237].
Rieder et al., "Sensorless Control of an External Rotor PMSM in the Whole Speed Range including Standstill using DC-link Measurements only", 2004 35th Annual IEEE Power Electronics Specialists Conference, 2004, pp. 1280-1285.
T. C. Green and B. W. Williams, "Control of Induction Motors Using Phase Current Feedback Derived From the DC Link", Proceedings of the European Conference on Power Electronics and Applications (EPE), 1989, pp. 1391-1396.
Communication dated Apr. 20, 2018, from European Patent Office in counterpart application No. 14903638.6.

* cited by examiner

FIG. 2

| Qup | Qun | Qvp | Qvn | Qwp | Qwn | VOLTAGE VECTOR | BUS CURRENT Idc |
|-----|-----|-----|-----|-----|-----|----------------|-----------------|
| 0 | 1 | 0 | 1 | 0 | 1 | V0 | 0 |
| 1 | 0 | 0 | 1 | 0 | 1 | V1 | Iu |
| 1 | 0 | 1 | 0 | 0 | 1 | V2 | -Iw |
| 0 | 1 | 1 | 0 | 0 | 1 | V3 | Iv |
| 0 | 1 | 1 | 0 | 1 | 0 | V4 | -Iu |
| 0 | 1 | 0 | 1 | 1 | 0 | V5 | Iw |
| 1 | 0 | 0 | 1 | 1 | 0 | V6 | -Iv |
| 1 | 0 | 1 | 0 | 1 | 0 | V7 | 0 |

FIG. 17

| θ [DEGREE] | 0~60 | 60~120 | 120~180 | 180~240 | 240~300 | 300~360 |
|---|---|---|---|---|---|---|
| TWO VOLTAGE VECTORS UPON BUS CURRENT DETECTION | V3、V4 | V5、V4 | V5、V6 | V1、V6 | V1、V2 | V3、V2 |

FIG. 18

| θ [DEGREE] | 0~60 | 60~120 | 120~180 | 180~240 | 240~300 | 300~360 |
|---|---|---|---|---|---|---|
| TWO VOLTAGE VECTORS UPON BUS CURRENT DETECTION | V3, V2 | V3, V4 | V5, V4 | V5, V6 | V1, V6 | V1, V2 |

FIG. 21

| θ [DEGREE] | 315~360 0~15 | 15~75 | 75~135 | 135~195 | 195~255 | 255~315 |
|---|---|---|---|---|---|---|
| TWO VOLTAGE VECTORS UPON BUS CURRENT DETECTION | V3、V4 | V5、V4 | V5、V6 | V1、V6 | V1、V2 | V3、V2 |

FIG. 22

| θ [DEGREE] | 315~360 0~15 | 15~75 | 75~135 | 135~195 | 195~255 | 255~315 |
|---|---|---|---|---|---|---|
| TWO VOLTAGE VECTORS UPON BUS CURRENT DETECTION | V3, V2 | V3, V4 | V5, V4 | V5, V6 | V1, V6 | V1, V2 |

FIG. 23

| θ [DEGREE] | 0~60 | 60~120 | 120~180 | 180~240 | 240~300 | 300~360 |
|---|---|---|---|---|---|---|
| TWO VOLTAGE VECTORS UPON BUS CURRENT DETECTION | V3, V4 | V5, V4 | V5, V6 | V1, V6 | V1, V2 | V3, V2 |

FIG. 24

| θ [DEGREE] | 15~75 | 75~135 | 135~195 | 195~255 | 255~315 | 315~360 0~15 |
|---|---|---|---|---|---|---|
| TWO VOLTAGE VECTORS UPON BUS CURRENT DETECTION | V3, V4 | V5, V4 | V5, V6 | V1, V6 | V1, V2 | V3, V2 |

FIG. 27

| θ [DEGREE] | 0~60 | 60~120 | 120~180 | 180~240 | 240~300 | 300~360 |
|---|---|---|---|---|---|---|
| TWO VOLTAGE VECTORS UPON BUS CURRENT DETECTION | V1, V6 | V1, V2 | V3, V2 | V3, V4 | V5, V4 | V5, V6 |

FIG. 28

| θ [DEGREE] | 0~60 | 60~120 | 120~180 | 180~240 | 240~300 | 300~360 |
|---|---|---|---|---|---|---|
| TWO VOLTAGE VECTORS UPON BUS CURRENT DETECTION | V5, V6 | V1, V6 | V1, V2 | V3, V2 | V3, V4 | V5, V4 |

FIG. 29

| θ [DEGREE] | 45~105 | 105~165 | 165~225 | 225~285 | 285~345 | 345~360 0~45 |
|---|---|---|---|---|---|---|
| TWO VOLTAGE VECTORS UPON BUS CURRENT DETECTION | V1, V6 | V1, V2 | V3, V2 | V3, V4 | V5, V4 | V5, V6 |

FIG. 30

| θ [DEGREE] | 45~105 | 105~165 | 165~225 | 225~285 | 285~345 | 345~360 0~45 |
|---|---|---|---|---|---|---|
| TWO VOLTAGE VECTORS UPON BUS CURRENT DETECTION | V5, V6 | V1, V6 | V1, V2 | V3, V2 | V3, V4 | V5, V4 |

FIG. 31

| θ [DEGREE] | 345~360 0~45 | 45~105 | 105~165 | 165~225 | 225~285 | 285~345 |
|---|---|---|---|---|---|---|
| TWO VOLTAGE VECTORS UPON BUS CURRENT DETECTION | V5, V6 | V1, V6 | V1, V2 | V3, V2 | V3, V4 | V5, V4 |

FIG. 32

| θ [DEGREE] | 0~60 | 60~120 | 120~180 | 180~240 | 240~300 | 300~360 |
|---|---|---|---|---|---|---|
| TWO VOLTAGE VECTORS UPON BUS CURRENT DETECTION | V5, V6 | V1, V6 | V1, V2 | V3, V2 | V3, V4 | V5, V4 |

FIG. 34

| θ [DEGREE] | $0-\theta_\beta$ $\sim 60-\theta_\beta$ | $60-\theta_\beta$ $\sim 120-\theta_\beta$ | $120-\theta_\beta$ $\sim 180-\theta_\beta$ | $180-\theta_\beta$ $\sim 240-\theta_\beta$ | $240-\theta_\beta$ $\sim 300-\theta_\beta$ | $300-\theta_\beta$ $\sim 360-\theta_\beta$ |
|---|---|---|---|---|---|---|
| TWO VOLTAGE VECTORS UPON BUS CURRENT DETECTION | V3, V4 | V5, V4 | V5, V6 | V1, V6 | V1, V2 | V3, V2 |

FIG. 35

| θ [DEGREE] | $0-\theta_\beta$ $\sim 60-\theta_\beta$ | $60-\theta_\beta$ $\sim 120-\theta_\beta$ | $120-\theta_\beta$ $\sim 180-\theta_\beta$ | $180-\theta_\beta$ $\sim 240-\theta_\beta$ | $240-\theta_\beta$ $\sim 300-\theta_\beta$ | $300-\theta_\beta$ $\sim 360-\theta_\beta$ |
|---|---|---|---|---|---|---|
| TWO VOLTAGE VECTORS UPON BUS CURRENT DETECTION | V3, V2 | V3, V4 | V5, V4 | V5, V6 | V1, V6 | V1, V2 |

POWER CONVERSION DEVICE, CONTROL METHOD FOR SAME, AND ELECTRIC POWER STEERING CONTROL DEVICE

CROSS REFERENCE TO RELATED APPLICATIONS

This application is a National Stage of International Application No. PCT/JP2014/076935filed Oct. 8, 2014, the contents of all of which are incorporated herein by reference in their entirety.

TECHNICAL FIELD

The present invention relates to a power conversion device, and the like, and more particularly, to detection of a bus current during operation.

BACKGROUND ART

In a vehicle steering device disclosed in Patent Literature 1, the phase of a sawtooth wave for generating a pulse width modulation (PWM) signal for each phase is shifted to shift a timing of falling to the low level of each of the PWM signals, thereby acquiring the value of a U phase current flowing through an electric motor based on an output signal of a current sensor in a period from the fall to the low level of a V phase PWM signal to an elapse of a period T1. Moreover, a total current value of the U phase current and a V phase current flowing through the electric motor is acquired based on an output signal of a current sensor in a period from the fall to the low level of a W phase PWM signal to an elapse of a period T2.

CITATION LIST

Patent Literature

[PTL 1] JP 2007-112416 A

SUMMARY OF INVENTION

Technical Problem

With the vehicle steering device disclosed in Patent Literature 1, a voltage vector that is on in one phase or in two phases at the timing of detecting the bus current is realized by shifting the phase of the sawtooth wave for generating the phase pulse width modulation (PWM) signal for each phase. As a result, the current of each phase can be detected based on the bus current. However, the carrier wave is shifted to generate the PWM signals, and a sequence of the rise is thus fixed to a sequence set in advance. For example, the rise may be in a sequence of the minimum phase, an intermediate phase, and the maximum phase depending on the angle of the motor, and a state (hereinafter referred to as regeneration mode) where a current flows from the motor to the power supply is thus brought about at the detection timing based on the bus current even while the motor is in the power running operation state, resulting in a large power loss. Moreover, the rise may be in a sequence of the maximum phase, the intermediate phase, and the minimum phase, and a state (hereinafter referred to as power running mode) where a current flows from the power supply to the motor is thus brought about at the detection timing based on the bus current even while the motor is in the regeneration operation state, resulting in a large power loss.

The present invention has been made in view of the above-mentioned problem, and therefore has an object to provide a power conversion device, and the like, for suppressing a variation amount of a bus current to decrease a power loss in consideration of control of detecting the bus current during an operation.

Solution to Problem

According to one embodiment of the present invention, there are provided a power conversion device, and the like, including: an AC rotating machine including a multi-phase winding of three or more phases; a DC power supply part configured to output a DC voltage; a voltage command calculation part configured to calculate a voltage command based on a control command from an outside for the AC rotating machine; a switching signal generation part configured to output a switching signal corresponding to at least two voltage vectors corresponding to the voltage command; a power conversion part configured to convert the DC voltage from the DC power supply part to an AC voltage based on the switching signal to supply the AC voltage to the AC rotating machine; a current detection part configured to detect a bus current, which is a current flowing between the DC power supply part and the power conversion part; and a phase current calculation part configured to calculate, based on the bus current, a phase current flowing through the multi-phase winding of the AC rotating machine, in which: the current detection part is configured to detect the bus current at timings at which the two voltage vectors are respectively output in accordance with the switching signal; and the switching signal generation part is configured to output a switching signal corresponding to a voltage vector for supplying a current from the DC power supply part to the AC rotating machine at a timing at which the bus current is detected by the current detection part when the AC rotating machine is in a power running operation state.

Advantageous Effects of Invention

According to the present invention, it is possible to provide the power conversion device, and the like, for suppressing the variation amount of the bus current to decrease the power loss in consideration of the control of detecting the bus current during the operation.

BRIEF DESCRIPTION OF DRAWINGS

FIG. 2 is a table for showing an example of a relationship among switching signals, voltage vectors, and currents flowing through a three-phase winding in the power conversion device according to the first embodiment of the present invention.

FIG. 17 is a table for showing an example of possible setting ranges of the two voltage vectors and the voltage vectors when a combination of the two voltage vectors is switched at the minimum electrical angle for bringing the mode into the power running mode upon the current detection for the two voltage vectors in a power running operation state over one cycle of the electrical angle in the case where the phase angle $\theta\beta$ is 0 degrees in the power conversion device according to the first embodiment of the present invention.

FIG. 18 is a table for showing an example of possible setting ranges of the two voltage vectors and the voltage vectors when the combination of the two voltage vectors is switched at the maximum electrical angle for bringing the mode into the power running mode upon the current detection for the two voltage vectors in the power running operation state over one cycle of the electrical angle in the case where the phase angle $\theta\beta$ is 0 degrees in the power conversion device according to the first embodiment of the present invention.

FIG. 21 is a table for showing an example of possible setting ranges of the two voltage vectors and the voltage vectors when the combination of the two voltage vectors is switched at the minimum electrical angle for bringing the mode into the power running mode upon the current detection for the two voltage vectors in the power running operation state over one cycle of the electrical angle in the case where the phase angle $\theta\beta$ is 45 degrees in the power conversion device according to the first embodiment of the present invention.

FIG. 22 is a table for showing an example of possible setting ranges of the two voltage vectors and the voltage vectors when the combination of the two voltage vectors is switched at the maximum electrical angle for bringing the mode into the power running mode upon the current detection for the two voltage vectors in the power running operation state over one cycle of the electrical angle in the case where the phase angle $\theta\beta$ is 45 degrees in the power conversion device according to the first embodiment of the present invention.

FIG. 23 is a table for showing an example of selection of the two voltage vectors when the combination of the two voltage vectors is switched at the minimum electrical angle for bringing the mode into the power running mode upon the current detection for the two voltage vectors in the power running operation state at any phase angle $\theta\beta$ of between 0 degrees and 45 degrees in the power conversion device according to the first embodiment of the present invention.

FIG. 24 is a table for showing an example of selection of the two voltage vectors when the combination of the two voltage vectors is switched at the maximum electrical angle for bringing the mode into the power running mode upon the current detection for the two voltage vectors in the power running operation state at any phase angle $\theta\beta$ of between 0 degrees and 45 degrees in the power conversion device according to the first embodiment of the present invention.

FIG. 27 is a table for showing an example of possible setting ranges of the two voltage vectors and the voltage vectors when the combination of the two voltage vectors is switched at the minimum electrical angle for bringing the mode into the power running mode upon the current detection for the two voltage vectors in the power running operation state over one cycle of the electrical angle in the case where the phase angle θβ is 180 degrees in the power conversion device according to the first embodiment of the present invention.

FIG. 28 is a table for showing an example of possible setting ranges of the two voltage vectors and the voltage vectors when the combination of the two voltage vectors is switched at the maximum electrical angle for bringing the mode into the power running mode upon the current detection for the two voltage vectors in the power running operation state over one cycle of the electrical angle in the case where the phase angle θβ is 180 degrees in the power conversion device according to the first embodiment of the present invention.

FIG. 29 is a table for showing an example of possible setting ranges of the two voltage vectors and the voltage vectors when the combination of the two voltage vectors is switched at the minimum electrical angle for bringing the mode into the power running mode upon the current detection for the two voltage vectors in the power running operation state over one cycle of the electrical angle in the case where the phase angle θβ is 135 degrees in the power conversion device according to the first embodiment of the present invention.

FIG. 30 is a table for showing an example of possible setting ranges of the two voltage vectors and the voltage vectors when the combination of the two voltage vectors is switched at the maximum electrical angle for bringing the mode into the power running mode upon the current detection for the two voltage vectors in the power running operation state over one cycle of the electrical angle in the case where the phase angle θβ is 135 degrees in the power conversion device according to the first embodiment of the present invention.

FIG. 31 is a table for showing an example of setting ranges of the two voltage vectors and the voltage vectors when the combination of the two voltage vectors is switched at the minimum electrical angle for bringing the mode into the power running mode upon the current detection for the two voltage vectors in the power running operation state at any phase angle θβ of between 135 degrees and 180 degrees in the power conversion device according to the first embodiment of the present invention.

FIG. 32 is a table for showing an example of setting ranges of the two voltage vectors and the voltage vectors when the combination of the two voltage vectors is switched at the maximum electrical angle for bringing the mode into the power running mode upon the current detection for the two voltage vectors in the power running operation state at any phase angle θβ of between 135 degrees and 180 degrees in the power conversion device according to the first embodiment of the present invention.

FIG. 34 is a table for showing an example of the setting ranges of the two voltage vectors and the voltage vectors when the combination of the two voltage vectors for bringing the mode into the power running mode in the power running operation state is switched at the minimum electrical angle for an arbitrary phase angle θβ in the power conversion device according to the second embodiment of the present invention.

FIG. 35 is a table for showing an example of the setting ranges of the two voltage vectors and the voltage vectors when the combination of the two voltage vectors for bringing the mode into the power running mode in the power running operation state is switched at the minimum electrical angle for an arbitrary phase angle θβ in the power conversion device according to the second embodiment of the present invention.

DESCRIPTION OF EMBODIMENTS

Figure 1:
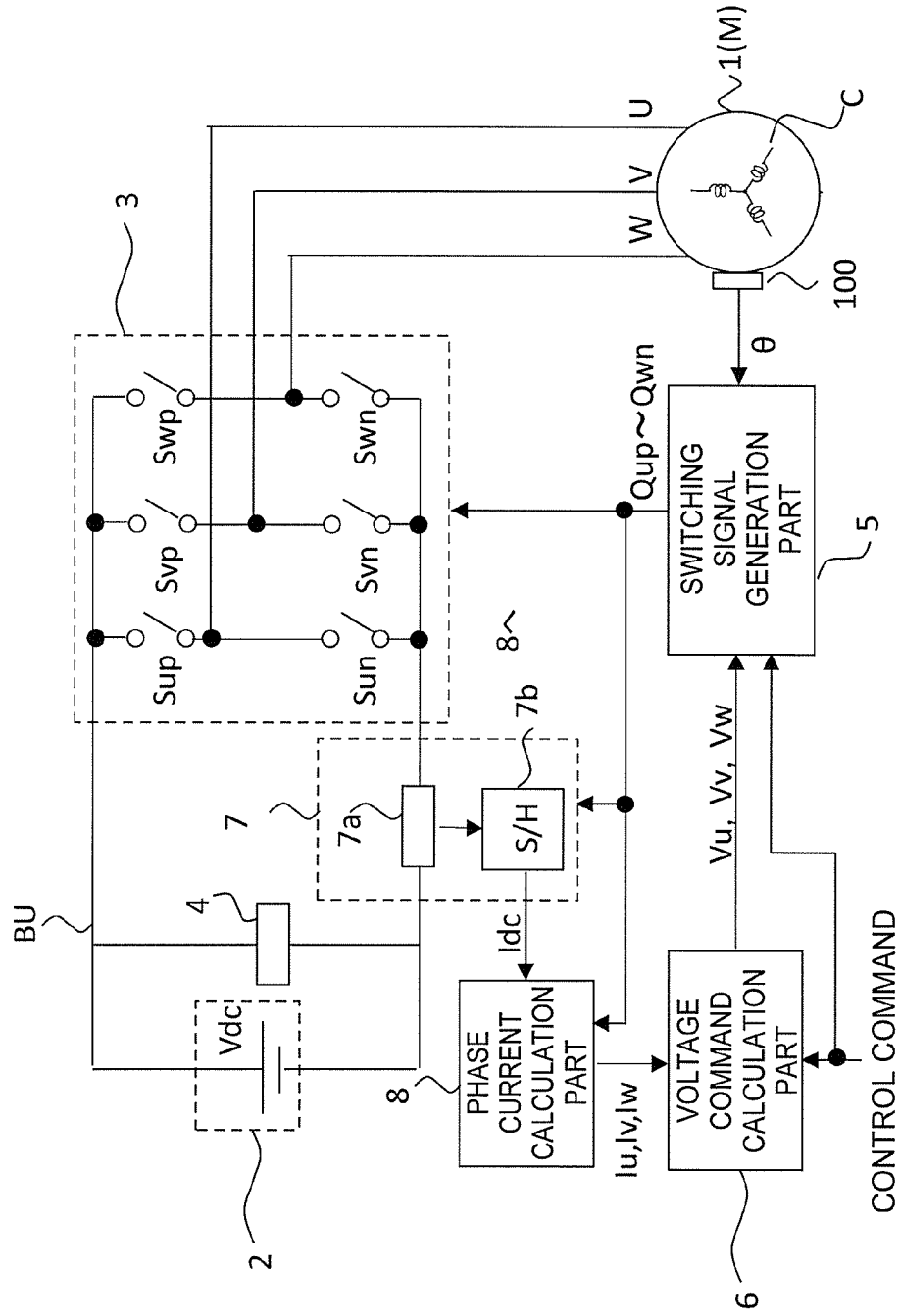
FIG. 1 is a diagram for illustrating an overall configuration of a power conversion device according to a first embodiment of the present invention.

In a power conversion device, and the like, according to the present invention, a power loss due to a variation in a bus current can be decreased by causing voltage vectors to bring a mode into a power running mode upon a timing of detection of the bus current when an AC rotating machine is in a power running operation state in control of a power conversion part by using switching signals in consideration of control of detecting the bus current during operation. Moreover, the power loss due to the variation in the bus current can be decreased by causing the voltage vectors to bring the mode into a regeneration mode at the timing of the detection of the bus current when the AC rotating machine is in a regeneration operation state.

A description is now given of respective embodiments of the power conversion device, and the like, according to the present invention referring to the drawings. In the respective embodiments, the same or corresponding components are denoted by the same numerals, and a redundant description thereof is not given.

First Embodiment

FIG. 1 is a diagram for illustrating an overall configuration of a power conversion device according to a first embodiment of the present invention. An AC rotating machine 1 is constructed by a permanent magnet synchronous rotating machine including a three-phase winding (generally, multi-phase winding) C having three phases U, V, and W.

A DC power supply 2 is configured to output a DC voltage Vdc to a power conversion part 3. This DC power supply 2 may include all devices that are configured to output a DC voltage, e.g., a battery, a DC-DC converter, a diode rectifier, and a PWM rectifier (any of which is not shown).

The power conversion part 3 is configured to turn on/off semiconductor switches Sup to Swn in accordance with switching signals Qup to Qwn, thereby applying power conversion to the DC voltage Vdc input from the DC power supply 2, and applying AC voltages on the three-phase windings U, V and W of the AC rotating machine 1. As each of the semiconductor switches Sup to Swn, a semiconductor switching device, e.g., an IGBT, a bipolar transistor, or a MOS power transistor and a diode connected to each other in an anti-parallel connection state are used. On this occasion, the switching signals Qup, Qun, Qvp, Qvn, Qwp, and Qwn are switching signals for respectively turning on/off the semiconductor switches Sup, Sun, Svp, Svn, Swp, and Swn in the power conversion part 3.

A smoothing capacitor 4 is configured to suppress a variation in the current flowing through a bus (BU), thereby realizing a stable DC current. In addition to a true capacitor capacitance Cc, an equivalent serial resistance Rc and a lead inductance Lc exist, which are not illustrated in detail. When charge is sufficiently accumulated, a current is generally supplied not from the DC power supply 2, but from the smoothing capacitor 4 to the AC rotating machine 1, and a description is given while the smoothing capacitor 4 is included in the configuration. However, an internal resistance exists in the DC power supply 2, and the same description is thus given of a case without the smoothing capacitor 4.

The DC power supply 2 or the part formed by the DC power supply 2 and the smoothing capacitor 4 constructs a DC power supply part.

A switching signal generation part 5 is configured to output the switching signals Qup to Qwn to which the pulse width modulation (PWM modulation) is applied in accordance with voltage commands Vu, Vv, and Vw output from a voltage command calculation part 6. The switching signals Qup to Qwn have pulse widths in accordance with the voltage commands Vu, Vv, and Vw.

On this occasion, according to the first embodiment, the power conversion part 3 is assumed to carry out an operation of converting the DC voltage from the DC power supply 2 or the smoothing capacitor to the AC voltage in accordance with the switching signals Qup to Qwn, and supplying the AC voltages to the AC rotating machine 1 in the power running operation. Moreover, according to a third embodiment of the present invention described later, the power conversion part 3 is assumed to carry out an operation of converting an electromotive force of the AC rotating machine 1 to the DC voltage in accordance with the switching signals Qup to Qwn, and supplying the DC voltage to the DC power supply 2 or the smoothing capacitor in the regeneration operation.

Moreover, a case in which the power conversion part 3 carries out both of the operation in the power running state and the operation in the regeneration state is included as described later according to the present invention.

According to the present invention, the switching signals Qup to Qwn are output to the power conversion part 3 as well as the current detection part 7 and the phase current calculation part 8 for the current detection, and the current detection part 7 and the phase current calculation part 8 are configured to respectively carry out the detection and the calculation in accordance with the switching signals Qup to Qwn. All the switching signals Qup to Qwn do not need to be output to the current detection part 7 and the phase current calculation part 8, and the same effect can be provided by using, for example, upper switching signals Qup, Qvp and Qwp or using another state variable that can represent states of the switching signals Qup to Qwn.

The voltage command calculation part 6 is configured to calculate the voltage commands Vu, Vv, and Vw for driving the AC rotating machine 1, and output the voltage commands Vu, Vv, and Vw to the switching signal generation part 5. As a calculation method for the voltage commands Vu, Vv, and Vw, for example, there is given V/F control of setting a speed (frequency) command f for the AC rotating machine 1 as the control command of FIG. 1 to determine the amplitude of the voltage commands. Moreover, there is used current feedback control of setting a current command for the AC rotating machine 1 as the control command, and calculating the voltage commands Vu, Vv, and Vw so that, based on deviations between the set control command (=current command) and the currents (phase currents) Iu, Iv, and Iw output by the phase current calculation part 8 described later and flowing through the three-phase winding, the deviations are zero by means of the proportional-integral control or the like.

The V/F control is feedforward control, and does not require the three-phase currents Iu, Iv, and Iw. Thus, the input of the three-phase currents Iu, Iv, and Iw to the voltage command calculation part 6 is not essential in this case.

The current detection part 7 is configured to detect a bus current Idc, which is a current flowing between the DC power supply 2 and the power conversion part 3, and output a detection result to the phase current calculation part 8. The current detection part 7 is constructed by a shunt resistor 7a and a sample-and-hold device 7b configured to sample and hold the current flowing through the shunt resistor 7a, thereby detecting the bus current Idc. A current transformer (CT) may be used in place of the shunt resistor 7a, and in this case, an output voltage of the current transformer is sampled and held by the sample-and-hold device 7b, thereby detecting the bus current Idc.

A description is now given of a relationship between voltage vectors based on the switching signals Qup to Qwn, the bus current Idc, and the currents Iu, Iv, and Iw flowing through the three-phase winding. In FIG. 2, the relationship among the switching signals Qup to Qwn, the voltage vectors, and the currents Iu, Iv, and Iw flowing through the three-phase winding is illustrated. In FIG. 2, when the value of one of Qup to Qwn is 1, one of the semiconductor switches Sup to Swn corresponding to the one of Qup to Qwn having the value of 1 is on. When the value of one of Qup to Qwn is 0, one of the semiconductor switches Sup to Swn corresponding to the one of Qup to Qwn having the value of 0 is off.

Figure 3:
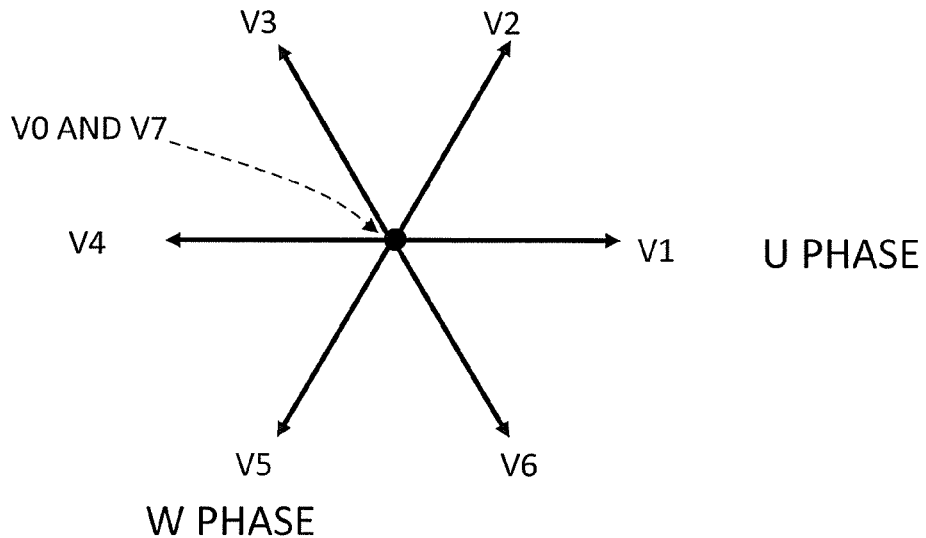
FIG. 3 is a diagram for illustrating a relationship between the voltage vectors and phase directions of the three-phase winding of an AC rotating machine according to the present invention.

The voltage vectors are illustrated in FIGS. 3. V1 to V6 are vectors different in the phase by 60 degrees from each other. V1, V3, and V5 have U, V, W phase directions of the three-phase winding, respectively. Moreover, V0 and V7 are voltage vectors having the magnitude of zero.

The phase current calculation part 8 is configured to output Iu, Iv, and Iw from the relationship shown in FIG. 2 based on the bus current Idc and the switching signals Qup to Qwn. V0 and V7 cannot be used to detect the three-phase currents based on the bus current. Thus, for example, the voltage vector V1 is output to detect Iu, and the voltage vector V2 is output to detect −Iw. There may be provided such a configuration that, based on the fact that, in the three-phase three-line rotating machine, a sum of the currents flowing through the three phases is zero, the acquired detected current values for the two phases are used to calculate a current of the remaining one phase. In other words, only such a configuration that appropriate voltage vectors are selected to detect the currents for at least two phases is necessary.

A position detector 100 is configured to output a phase θ of the AC rotating machine 1 to the switching signal generation part 5.

Figure 4:
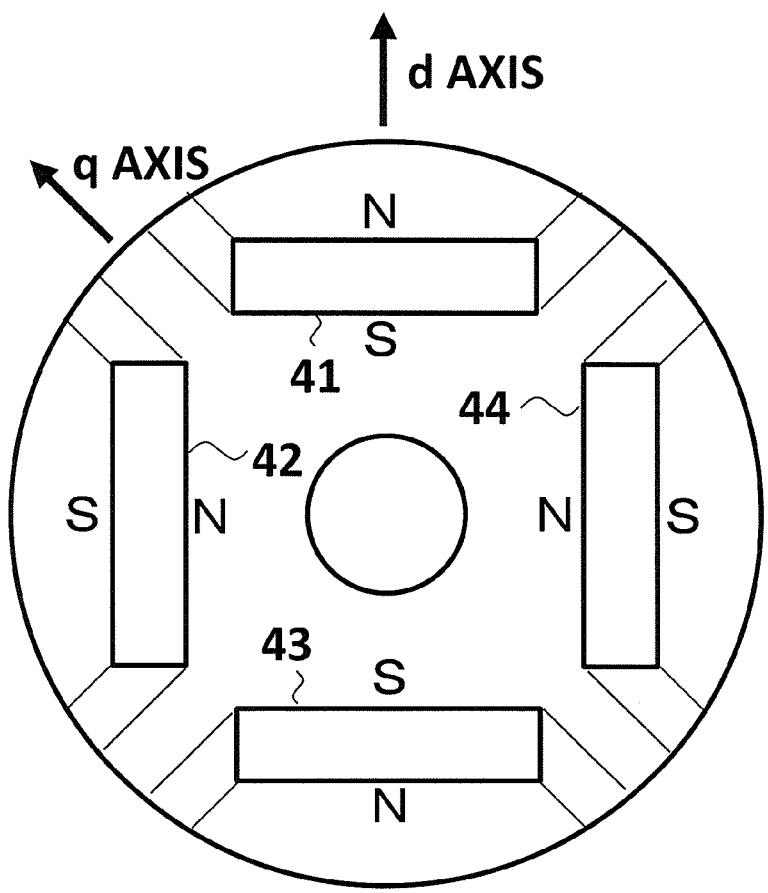
FIG. 4 is a diagram for illustrating an example of a basic structure of a rotor of the AC rotating machine of FIG. 1.

A detailed description is now given of the AC rotating machine 1. FIG. 4 is a diagram for illustrating a basic structure of a rotor of the AC rotating machine 1, and showing such a structure that permanent magnets 41 to 44 are embedded inside an iron core. Flux barriers are provided on both ends of each of the permanent magnets 41 to 44. In FIG. 4, a direction of a field pole generated by the permanent magnets is set to the d axis, and a direction advanced by 90 degrees in the electrical angle is set to the q axis. A case of a four-pole machine is illustrated in FIG. 4, and a direction advanced in 45 degrees in the mechanical angle with respect to the d axis is the q axis. The rotating machine 1 having this rotor structure is referred to as interior magnet synchronous rotating machine, has saliency, and there is a relationship Ld<Lq between a d axis inductance Ld and a q axis inductance Lq.

A description has been given of the interior magnet synchronous rotating machine where Ld≠Lq is satisfied, but Ld=Lq may be satisfied according to the present invention, which applies to all the AC rotating machines. For example, the present invention can be applied to other AC rotating machines, e.g., a surface magnet synchronous rotating machine, an inset permanent magnet synchronous rotating machine, a synchronous reluctance motor, and a switched reluctance motor. Moreover, a description is given of the rotor having four poles in FIG. 4, but the present invention can be applied to an AC rotating machine having an arbitrary number of poles as long as the number of the poles is an even natural number (not including 0).

Figure 5:
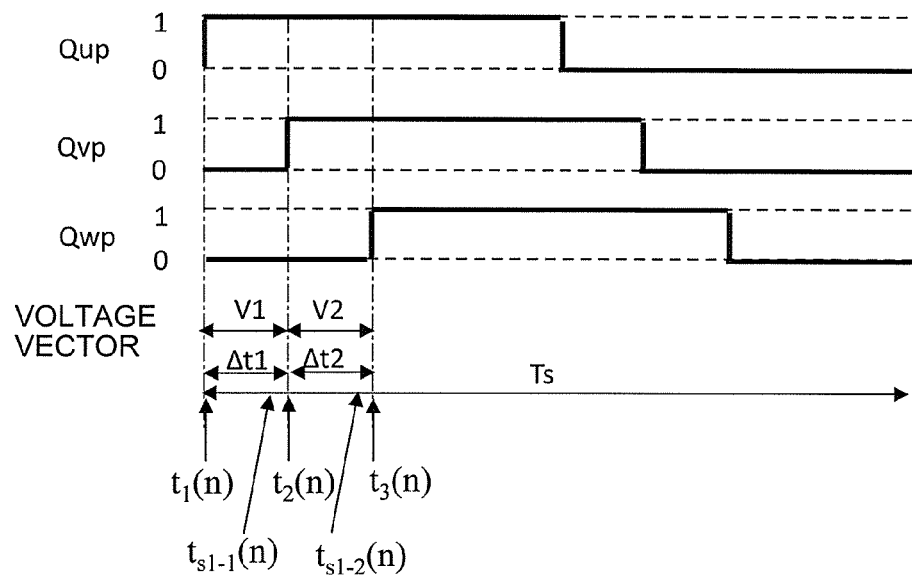
FIG. 5 is an operation explanatory diagram for illustrating an example of switching signals in a switching signal generation part, detection timings for a bus current in a current detection part, and the voltage vectors in the power conversion device according to the first embodiment of the present invention.

A detailed description is now given of the switching signal generation part 5. FIG. 5 is an operation explanatory diagram relating to a method of generating the switching signals Qup to Qwn in the switching signal generation part 5, and the detection timings of the bus current Idc in the current detection part 7 in a cycle Ts of the switching signals according to the first embodiment. Qun, Qvn, and Qwn illustrated in FIG. 2 are respectively in an inverted relationship (0 for 1 and 1 for 0 except for a dead time period) with Qup, Qvp, and Qwp, and are thus not illustrated.

Qup is set to 1, and Qvp and Qwp are set to 0 at a time point t1(n), and this switching pattern is maintained until a time point t2(n) after an elapse of Δt1 from the time point t1(n). With reference to FIG. 2, the voltage vector is V1 from the time point t1(n) to the time point t2(n). A first bus current Idc is detected at a time point ts1-1(n) in the period from the time point t1(n) to the time point t2(n). Δt1 is a set to a period longer than a sum of a dead time of the power conversion part 3 and a period for the current detection part 7 to detect the bus current Idc (such as a period required for settlement of ringing included in a detected waveform and a period required for the sampling and holding). With reference to FIG. 2, the voltage vector is V1 from the time point t1(n) to the time point t2(n), and the bus current Idc detected at the time point ts1-1(n) is equal to the current Iu flowing through the U phase.

Then, Qvp is set to 1 at the time point t2(n), and this switching pattern is maintained until a time point t3(n). With reference to FIG. 2, the voltage vector is V2 from the time point t2(n) to a time point t3(n). The bus current Idc is again detected at a time point ts1-2(n) at this timing. Δt2 is determined in the same way as in the case of Δt1. In general, Δt1=Δt2 is set. With reference to FIG. 2, the bus current Idc detected at the time point ts1-2(n) is equal to a value −Iw acquired by inverting the sign of the current flowing through the W phase. Then, Qwp is set to 1 at the time point t3(n). Pulse widths (periods in which the value 1 is maintained) of Qup to Qwp are determined by the voltage commands Vu, Vv, and Vw, and timings at which Qup to Qwp become 0 are thus determined in accordance with the pulse widths.

In the example illustrated in FIG. 5, the two voltage vectors V1 and V2 are generated by setting Qup, Qvp, and Qwp to 1 in this sequence, and the bus current Idc is detected during the generations of those voltage vectors in this way. On this occasion, the following five cases other than the example of FIG. 5 are conceivable by switching the sequence of setting the switching signals Qup to Qwp to 1.

Figure 6:
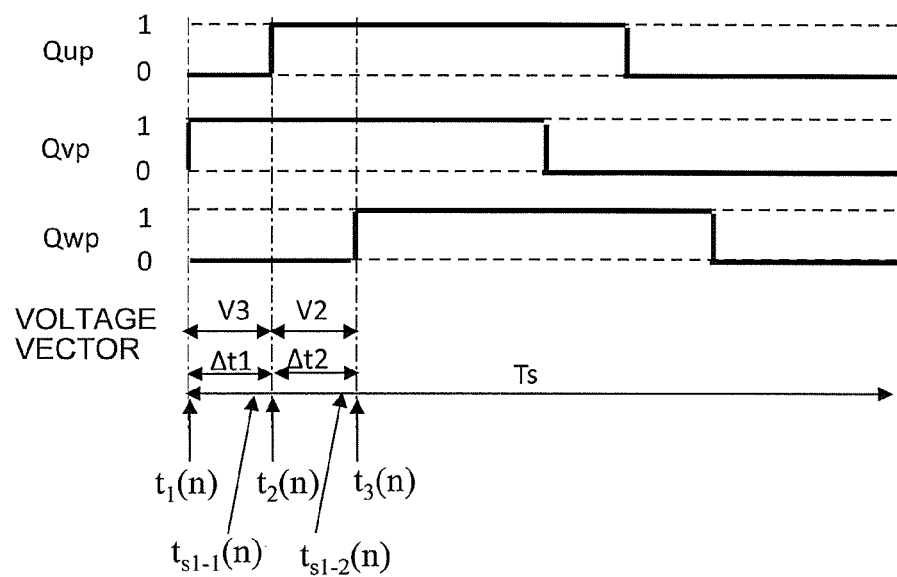
FIG. 6 is an operation explanatory diagram for illustrating another example of the switching signals in the switching signal generation part, the detection timings for the bus current in the current detection part, and the voltage vectors in the power conversion device according to the first embodiment of the present invention.

In a first case, as illustrated in FIG. 6, the two voltage vectors V3 and V2 are generated by setting Qvp, Qup, and Qwp to 1 in this sequence, and the bus current Idc is detected during the generations of those voltage vectors. With reference to FIG. 2, the bus current Idc detected at the time point ts1-1(n) is equal to the current Iv flowing through the V phase, and the bus current Idc detected at the time point ts1-2(n) is equal to a sign-inverted value −Iw of the current flowing through the W phase.

Figure 7:
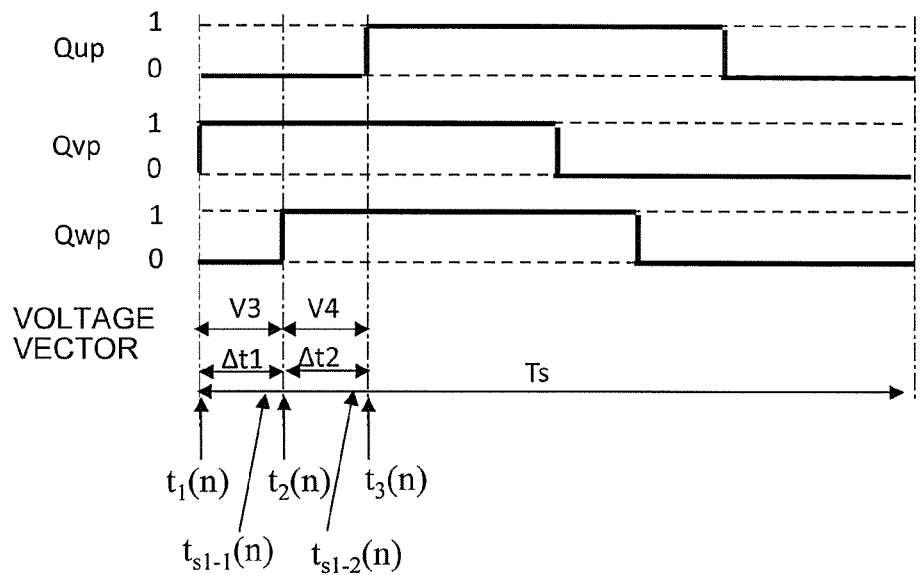
FIG. 7 is an operation explanatory diagram for illustrating another example of the switching signals in the switching signal generation part, the detection timings for the bus current in the current detection part, and the voltage vectors in the power conversion device according to the first embodiment of the present invention.

In a second case, as illustrated in FIG. 7, the two voltage vectors V3 and V4 are generated by setting Qvp, Qwp, and Qup to 1 in this sequence, and the bus current Idc is detected during the generations of those voltage vectors. With reference to FIG. 2, the bus current Idc detected at the time point ts1-1(n) is equal to the current Iv flowing through the V phase, and the bus current Idc detected at the time point ts1-2(n) is equal to a sign-inverted value −Iu of the current flowing through the U phase.

Figure 8:
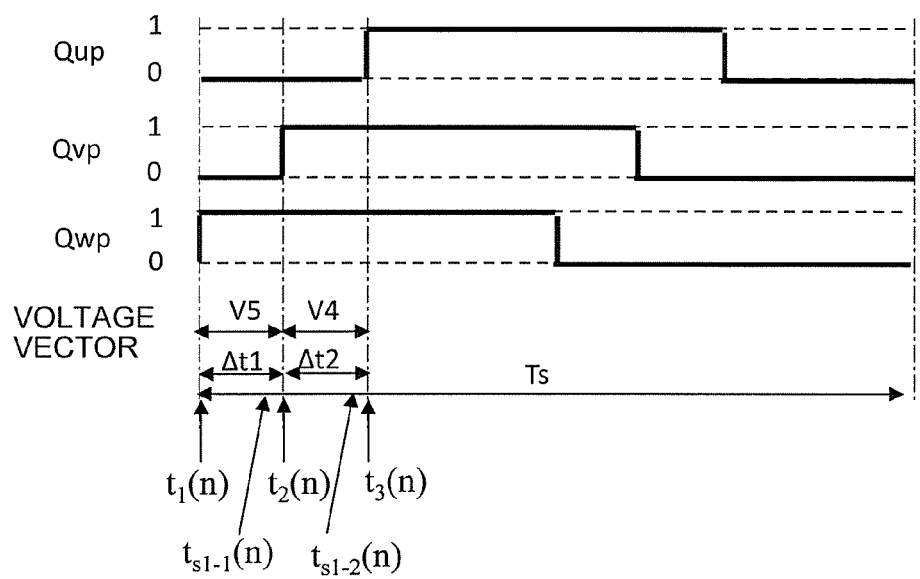
FIG. 8 is an operation explanatory diagram for illustrating another example of the switching signals in the switching signal generation part, the detection timings for the bus current in the current detection part, and the voltage vectors in the power conversion device according to the first embodiment of the present invention.

In a third case, as illustrated in FIG. 8, the two voltage vectors V5 and V4 are generated by setting Qwp, Qvp, and Qup to 1 in this sequence, and the bus current Idc is detected during the generations of those voltage vectors. With reference to FIG. 2, the bus current Idc detected at the time point ts1-1(n) is equal to the current Iw flowing through the W phase, and the bus current Idc detected at the time point ts1-2(n) is equal to the sign-inverted value −Iu of the current flowing through the U phase.

Figure 9:
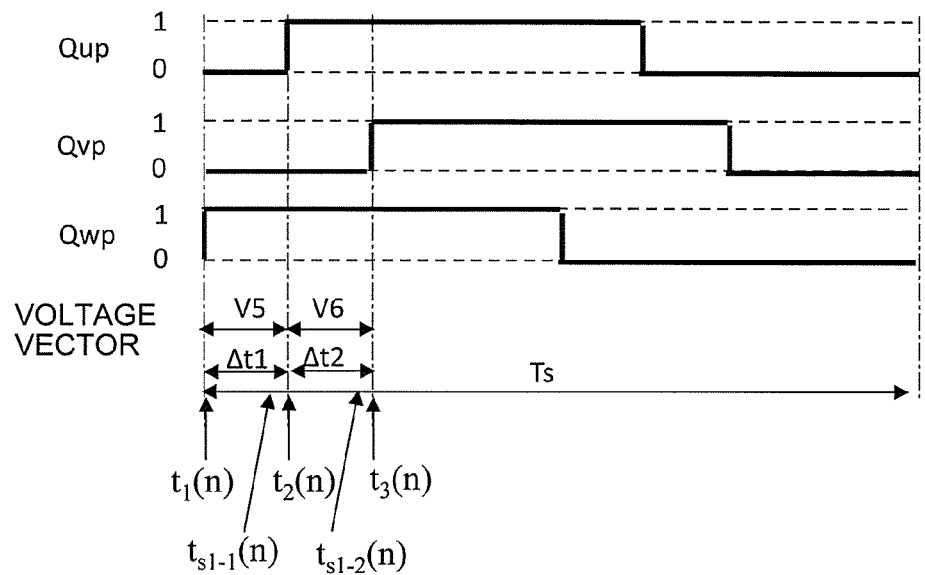
FIG. 9 is an operation explanatory diagram for illustrating another example of the switching signals in the switching signal generation part, the detection timings for the bus current in the current detection part, and the voltage vectors in the power conversion device according to the first embodiment of the present invention.

In a fourth case, as illustrated in FIG. 9, the two voltage vectors V5 and V6 are generated by setting Qwp, Qup, and Qvp to 1 in this sequence, and the bus current Idc is detected during the generations of those voltage vectors. With reference to FIG. 2, the bus current Idc detected at the time point ts1-1(n) is equal to the current Iw flowing through the W phase, and the bus current Idc detected at the time point ts1-2(n) is equal to a sign-inverted value −Iv of the current flowing through the V phase.

Figure 10:
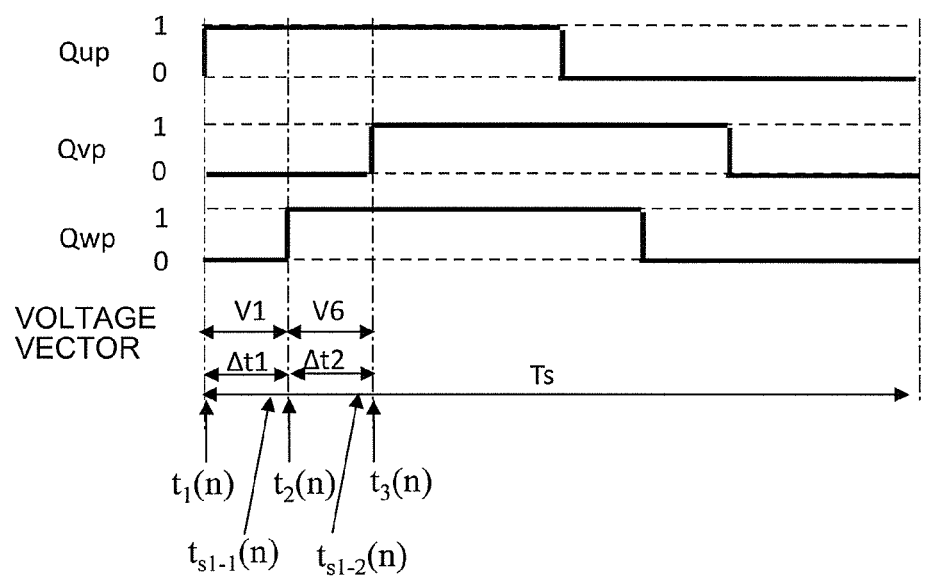
FIG. 10 is an operation explanatory diagram for illustrating another example of the switching signals in the switching signal generation part, the detection timings for the bus current in the current detection part, and the voltage vectors in the power conversion device according to the first embodiment of the present invention.

In a fifth case, as illustrated in FIG. 10, the two voltage vectors V1 and V6 are generated by setting Qup, Qwp, and Qvp to 1 in this sequence, and the bus current Idc is detected during the generations of those voltage vectors. With reference to FIG. 2, the bus current Idc detected at the time point ts1-1(n) is equal to the current Iu flowing through the U phase, and the bus current Idc detected at the time point ts1-2(n) is equal to a sign-inverted value −Iv of the current flowing through the V phase.

According to the first embodiment, the combinations ("V1, V2", "V3, V2", "V3, V4", "V5, V4", "V5, V6", and "V1, V6") of the two voltage vectors in the six patterns illustrated in FIG. 5 to FIG. 10 upon the bus current detections are switched to be output in accordance with the rotational position 8 of the AC rotating machine 1.

Figure 11:
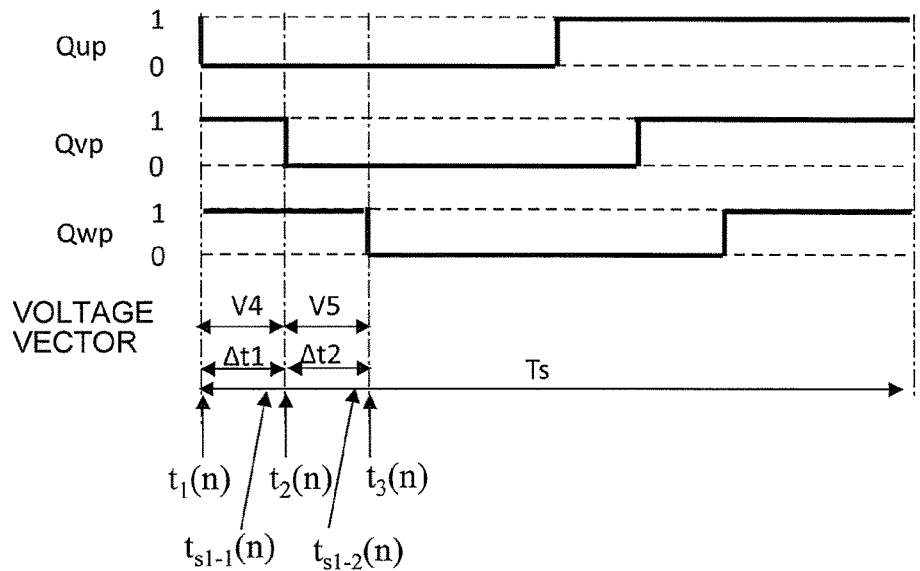
FIG. 11 is an operation explanatory diagram for illustrating the switching signals in the switching signal generation part, the detection timings for the bus current in the current detection part, and the voltage vectors in a power conversion device according to a modified example of the first embodiment of the present invention.

According to the first embodiment, a description is given of the method of shifting the timing of raising the PWM pulse in the six patterns illustrated in FIG. 5 to FIG. 10, thereby generating the desired voltage vector and detecting the bus current Idc, but a timing of dropping the PWM pulse may be sifted, thereby generating the desired voltage vector and detecting the bus current Idc as illustrated in FIG. 11. As illustrated in FIG. 11, the two voltage vectors V4 and V5 are generated by setting Qup, Qvp, and Qwp to 0 in this sequence, and the bus current Idc is detected during the generations of the voltage vectors. With reference to FIG. 2, the bus current Idc detected at the time point ts1-1(n) is equal to a sign-inverted value −Iu of the current flowing through the U phase, and the bus current Idc detected at the time point ts1-2(n) is equal to the Iw flowing through the W phase.

As the cases illustrated in FIG. 6 to FIG. 10, the following five cases other than the example of FIG. 11 are conceivable by switching the sequence of setting the switching signals Qup to Qwp to 0. Also in this case, the combinations ("V1, V2", "V3, V2", "V3, V4", "V5, V4", "V5, V6", and "V1, V6") of the two voltage vectors in the six patterns upon the bus current detections exit, and the same effect is provided as in the cases illustrated in FIG. 5 to FIG. 10.

A description is now given of a difference in the bus current in accordance with the combination of the two voltage vectors for a case where Iu>Iv>0 and Iw<0 are satisfied while the AC rotating machine 1 is in the power running operation state.

Figure 12:
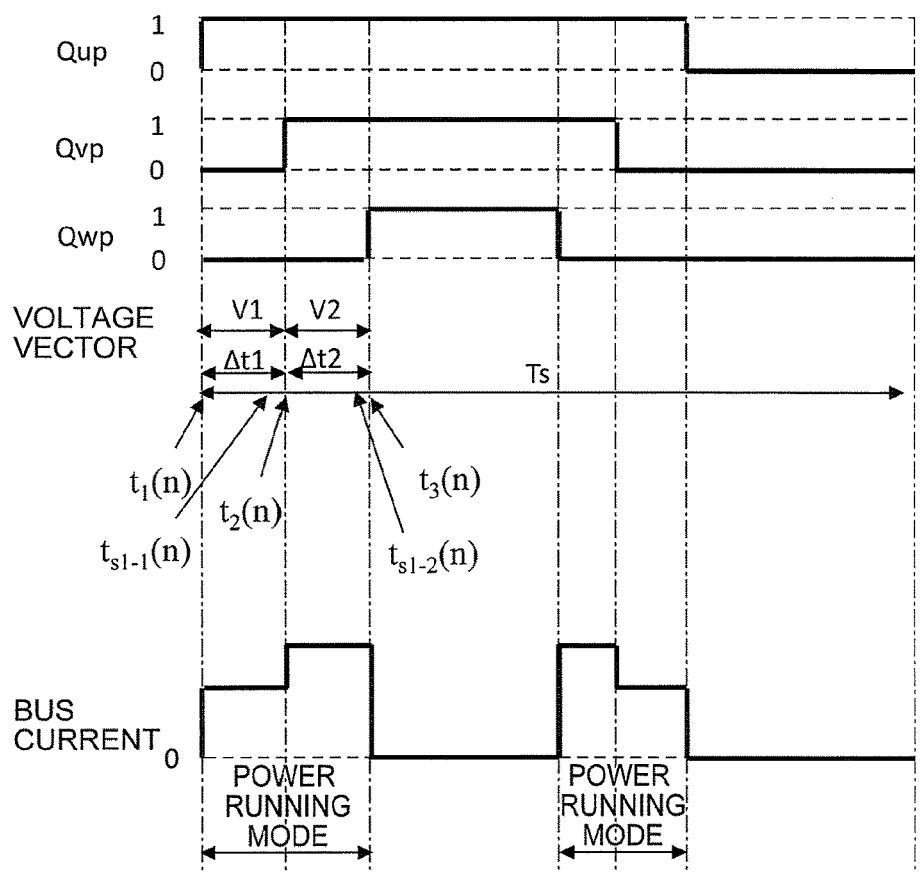
FIG. 12 is an operation explanatory diagram for illustrating an example of the switching signals in the switching signal generation part, the detection timings for the bus current in the current detection part, the voltage vectors, and the bus current in the power conversion device according to the first embodiment of the present invention.

FIG. 12 is a diagram for illustrating an operation when the two voltage vectors V1 and V2 are generated by setting Qup, Qvp, and Qwp to 1 in this sequence, and the bus current Idc is detected during the generations of the voltage vectors. The sum of the three-phase currents is zero, and when any one of the three-phase currents has a different value, the current in least one phase thus has a negative value.

The bus current Idc detected at the time point ts1-1(n) is equal to the current Iu flowing through the U phase, the bus current Idc has a positive value, and the mode is in the power running mode in which the bus current Idc flows from the DC power supply 2 or the smoothing capacitor 4 to the AC rotating machine 1.

The bus current Idc detected at the time point ts1-2(n) is equal to the sign-inverted value −Iw flowing through the W phase, the bus current Idc has a positive value, and the mode is in the power running mode in which the bus current Idc flows from the DC power supply 2 or the smoothing capacitor 4 to the AC rotating machine 1.

Figure 13:
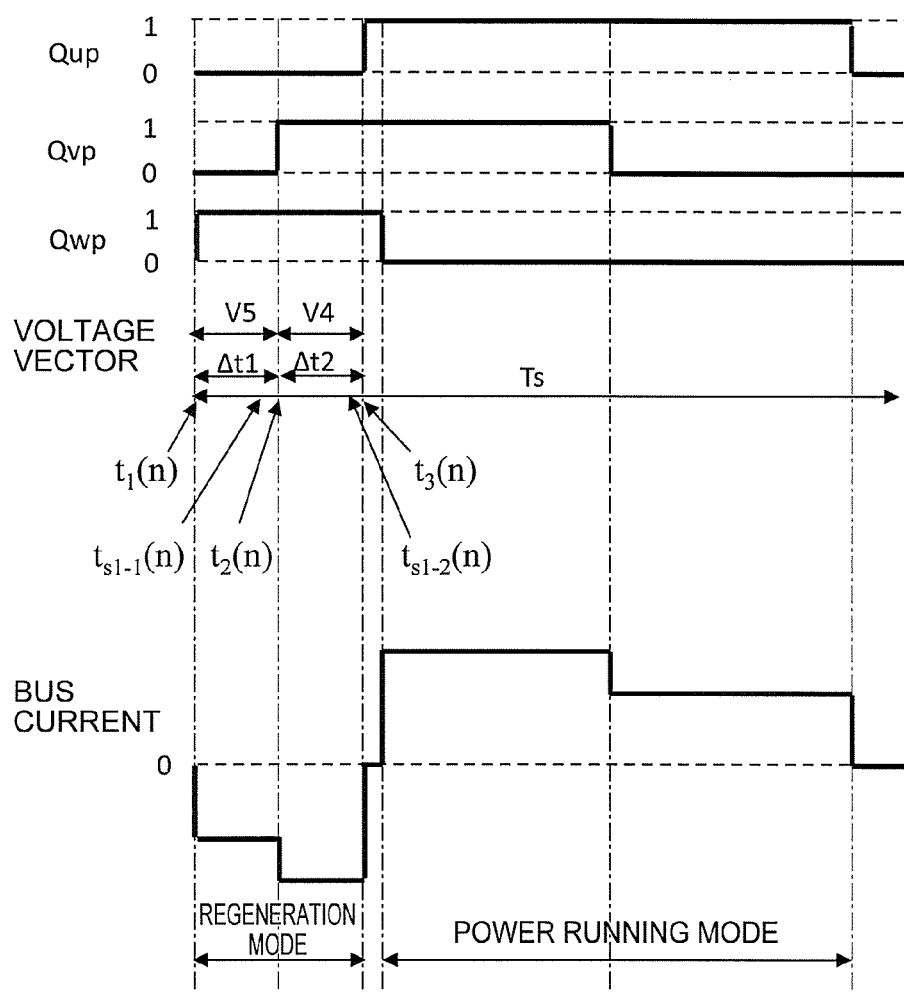
FIG. 13 is an operation explanatory diagram for illustrating a comparative example of FIG. 12.

FIG. 13 is a diagram for illustrating an operation when the two voltage vectors V5 and V4 are generated by setting Qwp, Qvp, and Qup to 1 in this sequence, and the bus current Idc is detected during the generations of the voltage vectors.

The bus current Idc detected at the time point ts1-1(n) is equal to the current Iw flowing through the W phase, the bus current Idc has a negative value, and the mode is in the regeneration mode in which the bus current Idc flows from the AC rotating machine 1 to the DC power supply 2 or the smoothing capacitor 4.

The bus current Idc detected at the time point ts1-2(n) is equal to the sign-inverted value −Iu flowing through the U phase, the bus current Idc has a negative value, and the mode is in the regeneration mode in which the bus current Idc flows from the AC rotating machine 1 to the DC power supply 2 or the smoothing capacitor 4.

A power loss in the smoothing capacitor 4 is acquired by a product of the square of the bus current Idc and the equivalent serial resistance Rc. When the voltage vectors are selected as illustrated in FIG. 12, a power loss is generated in portions in the power running mode other than regions in which the voltage vector is V0 or V7. When the voltage vectors are selected as illustrated in FIG. 13, the period of the power running mode is increased by a period of the regeneration mode, a power loss is generated even in the regeneration mode, and a power loss increases when the voltage vectors, which bring the mode into the regeneration mode in the power running operation state, are selected.

Thus, the switching signal generation part 5 is configured to output the switching signals corresponding to the two voltage vectors that bring the mode into the power running mode upon the current detection in the power running operation state in order to decrease the power loss in the first embodiment.

A description is now given of a method of selecting the two voltage vectors that bring the mode into the power running mode in the power running operation state.

Figure 14:
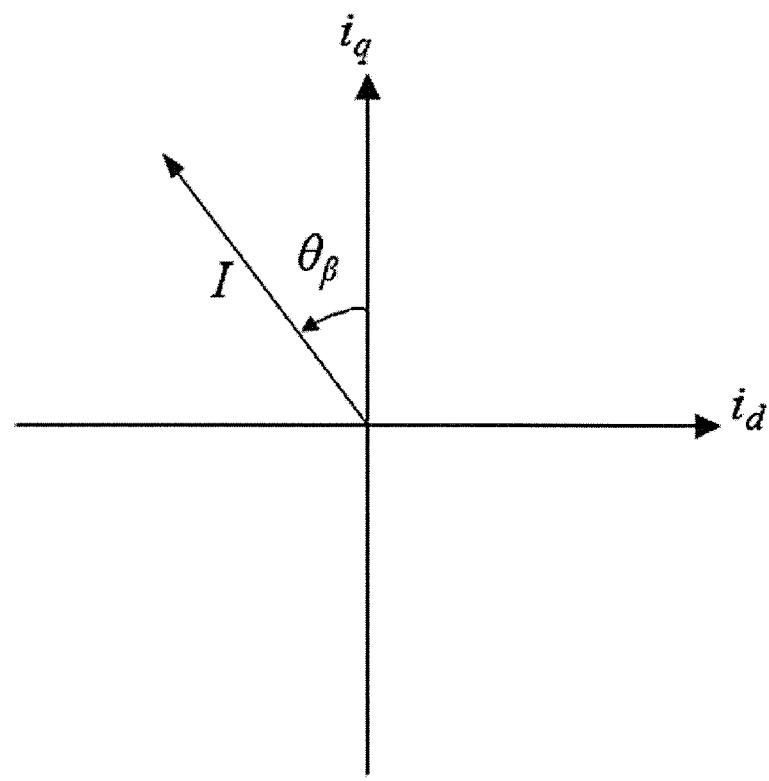
FIG. 14 is a diagram for illustrating a current vector on a plane having d and q axis currents as axes in the power conversion device according to the first embodiment of the present invention.

As illustrated in FIG. 14, when the phase angle $\theta\beta$ of a current vector is defined on a plane having the d and q axis currents as axes, and a current effective value is denoted by Irms, the three-phase currents are represented as Equation (1).

$$iu1=\sqrt{(2)} \cdot Irms \cdot \sin(\theta+\theta\beta-\pi)$$

$$iv1=\sqrt{(2)} \cdot Irms \cdot \sin(\theta+\theta\beta+(\pi/3))$$

$$iw1=\sqrt{(2)} \cdot Irms \cdot \sin(\theta+\theta\beta-(\pi/3)) \quad (1)$$

Moreover, the torque acquired on the AC rotating machine 1 is represented as Equation (2). When the reluctance torque does not exist, the output torque is determined in accordance with the magnitude of the q axis current iq independently of the d axis current id. When the reluctance torque exists, the output torque varies in accordance with a distribution between id and iq, and the phase angle $\theta\beta$ of the current vector that provides the maximum torque at the minimum current is in a range of from 0 degrees to 45 degrees or from 135 degrees to 180 degrees.

$$T=Pm \cdot \{\varphi+(Ld-Lq)id\}iq \quad (2)$$

where:
T: torque,
Pm: number of pairs of poles,
$\varphi$: magnetic flux,
Ld: d axis inductance,
Lq: q axis inductance,
id: d axis current, and
iq: q axis current.

Figure 15:
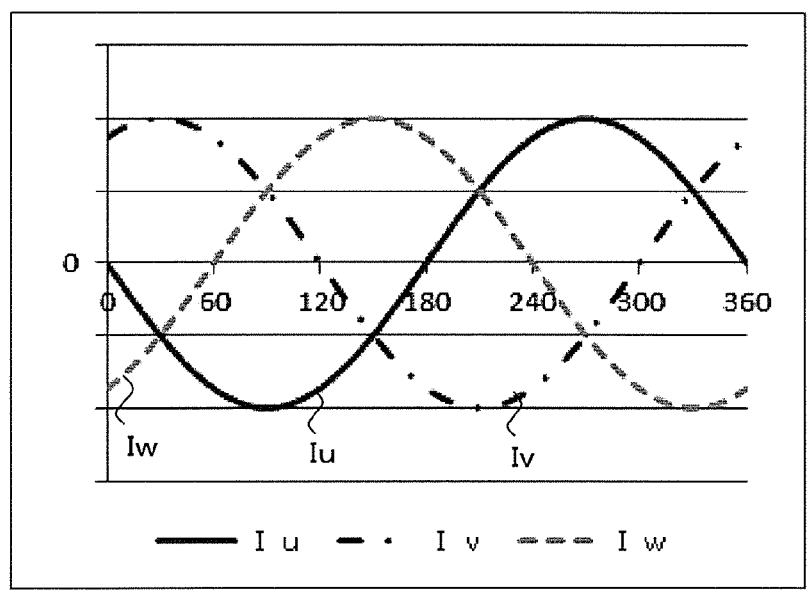
FIG. 15 is a diagram for illustrating three-phase currents when a phase angle $\theta\beta$ is 0 degrees in the power conversion device according to the first embodiment of the present invention.

The three-phase currents when the phase angle $\theta\beta$ is 0 degrees are illustrated in FIG. 15. The U phase current Iu is equal to or more than 0 in a range of from 180 degrees to 360 degrees. The V phase current Iv is equal to or more than 0 in a range of from 0 degrees to 120 degrees and in a range of from 300 degrees to 360 degrees. The W phase current Iw is equal to or more than 0 in a range of from 60 degrees to 240 degrees.

In other words, in order to bring the mode into the power running mode upon the current detection for the first voltage vector, when the voltage vector is the voltage vector V1, the range needs to be from 180 degrees to 360 degrees, when the voltage vector is the voltage vector V3, the range needs to be from 0 degrees to 120 degrees or from 300 degrees to 360 degrees, and when the voltage vector is the voltage vector V5, the range needs to be from 60 degrees to 240 degrees.

On the other hand, the U phase current Iu is equal to or less than 0 in a range of from 0 degrees to 180 degrees. The V phase current Iv is equal to or less than 0 in a range of from 120 degrees to 300 degrees. The W phase current Iw is equal to or less than 0 in a range of from 0 degrees to 60 degrees and in a range of from 240 degrees to 360 degrees.

In other words, in order to bring the mode into the power running mode upon the current detection for the second voltage vector, when the voltage vector is the voltage vector V4, the range needs to be from 0 degrees to 180 degrees, when the voltage vector is the voltage vector V6, the range needs to be from 120 degrees to 300 degrees, and when the voltage vector is the voltage vector V2, the range needs to be from 0 degrees to 60 degrees or from 240 degrees to 360 degrees.

Figure 16:
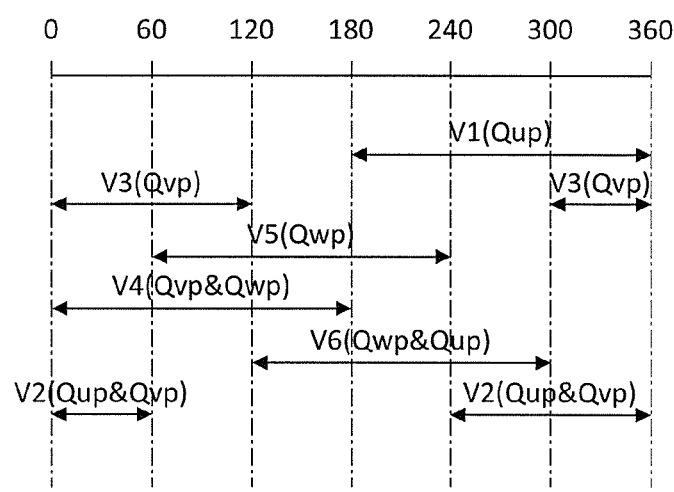
FIG. 16 is a diagram for illustrating possible setting ranges of two voltage vectors when the phase angle $\theta\beta$ is 0 degrees in the power conversion device according to the first embodiment of the present invention.

Possible setting ranges of the two voltage vectors are illustrated in FIG. 16. For example, for a case where the electrical angle is 90 degrees, the switching signals need to be set to 1 in any one of a sequence of Qvp, Qwp, and Qup (V3, V4) and a sequence of Qwp, Qvp, and Qup (V5, V4). In other words, two options exist for the first voltage vector in the ranges of from 60 degrees to 120 degrees, from 180 degrees to 240 degrees, and from 300 degrees to 360 degrees. Moreover, two options exist for the second voltage vector in the ranges of from 0 degrees to 60 degrees, from 120 degrees to 180 degrees, and from 240 degrees to 300 degrees.

Examples in which the mode becomes the power running mode upon the current detection for the two voltage vectors in the power running operation state over one cycle of the electrical angle are shown in FIG. 17 and FIG. 18.

FIG. 17 is a table for showing a case where the switching of the combination of the two voltage vectors is carried out at the minimum electrical angle in each of the possible setting ranges extending over 180 degrees.

FIG. 18 is a table for showing a case where the switching of the combination of the two voltage vectors is carried out at the maximum electrical angle in each of the possible setting ranges extending over 180 degrees.

The same effect as that of those two cases can be acquired by selecting the two voltage vectors included in the possible setting ranges of FIG. 16.

Figure 19:
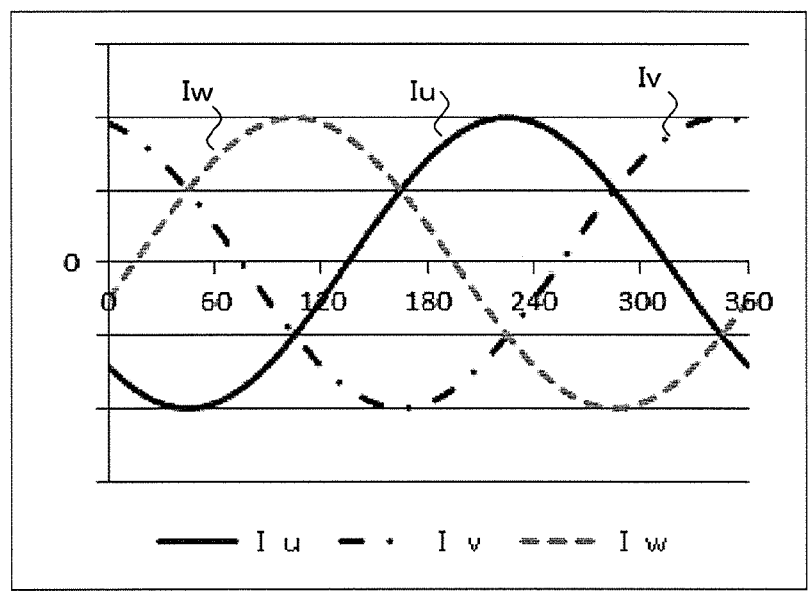
FIG. 19 is a diagram for illustrating three-phase currents when the phase angle $\theta\beta$ is 45 degrees in the power conversion device according to the first embodiment of the present invention.

The three-phase currents when the phase angle θβ is 45 degrees are illustrated in FIG. 19. The U phase current Iu is equal to or more than 0 in a range of from 135 degrees to 315 degrees. The V phase current Iv is equal to or more than 0 in a range of from 0 degrees to 75 degrees and in a range of from 255 degrees to 360 degrees. The W phase current Iw is equal to or more than 0 in a range of from 15 degrees to 195 degrees.

In other words, in order to bring the mode into the power running mode upon the current detection for the first voltage vector, when the voltage vector is the voltage vector V1, the range needs to be from 135 degrees to 315 degrees, when the voltage vector is the voltage vector V3, the range needs to be from 0 degrees to 75 degrees or from 255 degrees to 360 degrees, and when the voltage vector is the voltage vector V5, the range needs to be from 15 degrees to 195 degrees.

On the other hand, the U phase current Iu is equal to or less than 0 in a range of from 0 degrees to 135 degrees and 315 degrees to 360 degrees. The V phase current Iv is equal to or less than 0 in a range of from 75 degrees to 255 degrees. The W phase current Iw is equal to or less than 0 in a range of from 0 degrees to 15 degrees and in a range of from 195 degrees to 360 degrees.

In other words, in order to bring the mode into the power running mode upon the current detection for the second voltage vector, when the voltage vector is the voltage vector V4, the range needs to be from 0 degrees to 135 degrees and 315 degrees to 360 degrees, when the voltage vector is the voltage vector V6, the range needs to be from 75 degrees to 255 degrees, and when the voltage vector is the voltage vector V2, the range needs to be from 0 degrees to 15 degrees or from 195 degrees to 360 degrees.

Figure 20:
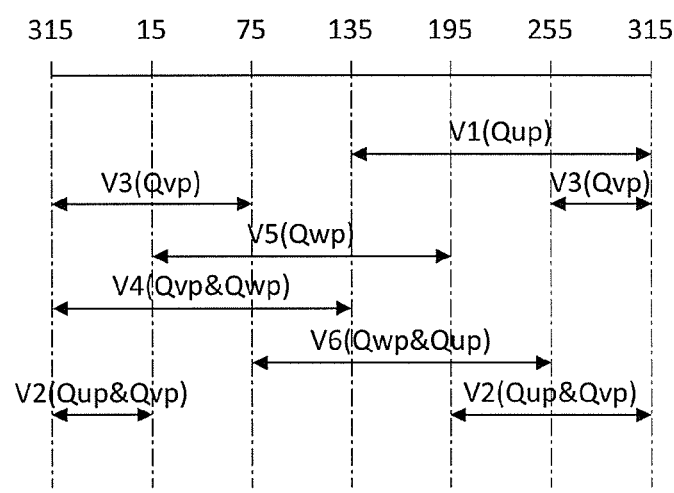
FIG. 20 is a diagram for illustrating possible setting ranges of the two voltage vectors when the phase angle $\theta\beta$ is 45 degrees in the power conversion device according to the first embodiment of the present invention.

Possible setting ranges of the two voltage vectors are illustrated in FIG. 20. For easy comparison with FIG. 16, only the axis of the electrical angle is shifted. For example, for the case where the electrical angle is 45 degrees, the switching signals need to be set to 1 in any one of a sequence of Qvp, Qwp, and Qup and a sequence of Qwp, Qvp, and Qup.

Examples in which the mode is the power running mode upon the current detection for the two voltage vectors in the power running operation state over one cycle of the electrical angle are shown in FIG. 21 and FIG. 22 in the same manner as the case where the phase angle θβ is 0 degrees.

FIG. 21 is a table for showing a case where the switching of the combination of the two voltage vectors is carried out at the minimum electrical angle in each of the possible setting ranges extending over 180 degrees.

FIG. 22 is a table for showing a case where the switching of the combination of the two voltage vectors is carried out at the maximum electrical angle in each of the possible setting ranges extending over 180 degrees.

The same effect as that of those two cases can be acquired by selecting the two voltage vectors included in the possible setting ranges of FIG. 20.

With reference to FIG. 17, FIG. 18, FIG. 21, and FIG. 22, in order to bring the mode into the power running mode upon the current detection for the two voltage vectors in the power running operation state at any phase angle θβ between 0 degrees and 45 degrees, the two voltage vectors only need to be selected, for example, as in FIG. 23 or FIG. 24.

Moreover, the same effect as that of those two cases can be acquired by selecting the two voltage vectors satisfying the possible setting ranges of FIG. 16 and FIG. 20.

Figure 25:
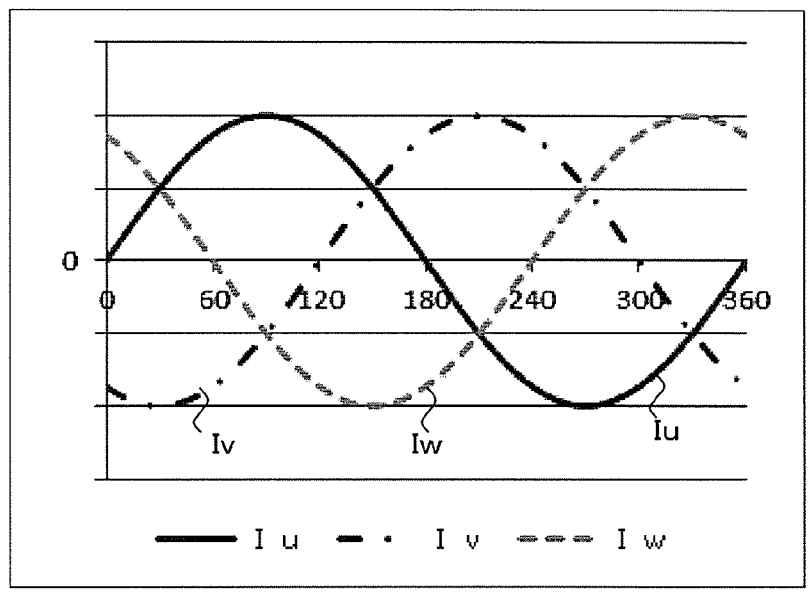
FIG. 25 is a diagram for illustrating the three phase currents when the phase angle $\theta\beta$ is 180 degrees in the power conversion device according to the first embodiment of the present invention.
Figure 26:
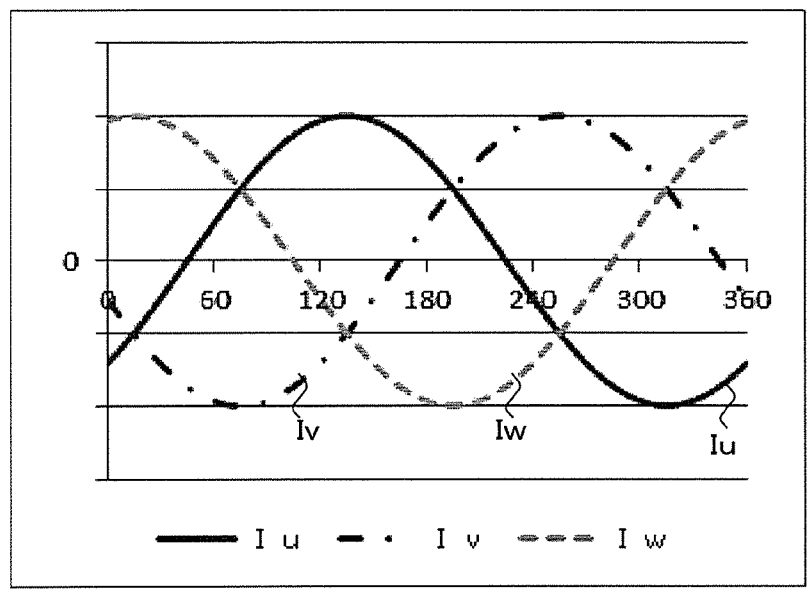
FIG. 26 is a diagram for illustrating the three phase currents when the phase angle $\theta\beta$ is 135 degrees in the power conversion device according to the first embodiment of the present invention.

The three-phase currents in a case where the phase angle θβ is 180 degrees are illustrated in FIG. 25, and the three-phase currents in a case where the phase angle θβ is 135 degrees are illustrated in FIG. 26.

Examples in which the mode becomes the power running mode upon the current detection for the two voltage vectors in the power running operation state over one cycle of the electrical angle are shown in FIG. 27 and FIG. 28 in the case where the phase angle θβ is 180 degrees. FIG. 27 is a table for showing a case where the combination of the two voltage vectors is switched at the minimum electrical angle. FIG. 28 is a table for showing a case where the combination of the two voltage vectors is switched at the maximum electrical angle. The same effect as that of those two cases can be acquired by selecting the two voltage vectors included in the possible setting ranges, which are not illustrated.

Examples in which the mode becomes the power running mode upon the current detection for the two voltage vectors in the power running operation state over one cycle of the electrical angle are shown in FIG. 29 and FIG. 30 in the case where the phase angle θβ is 135 degrees. FIG. 29 is a table for showing a case where the combination of the two voltage vectors is switched at the minimum electrical angle. FIG. 30 is a table for showing a case where the combination of the two voltage vectors is switched at the maximum electrical angle. The same effect as that of those two cases can be acquired by selecting the two voltage vectors included in the possible setting ranges, which are not illustrated.

With reference to FIG. 27 to FIG. 30, in order to bring the mode into the power running mode upon the current detection for the two voltage vectors in the power running operation state at any phase angle θβ between 135 degrees and 180 degrees, the two voltage vectors only need to be selected, for example, as in FIG. 31 or FIG. 32.

Moreover, the same effect as that of those two cases can be acquired by selecting the two voltage vectors satisfying the possible setting ranges at any phase angle θβ.

For example, by selecting the two voltage vectors as in FIG. 23 for the case where the q axis component of the current vector is positive, and as in FIG. 31 for the case where the q axis component of the current vector is negative, the two voltage vectors for bringing the mode into the power running mode in the power running operation state can be output, thereby detecting the current to decrease the power loss.

The current vector on this occasion is based on the detected current or the current command when the current command is included in the control command, but a voltage vector based on a voltage command can provide the same effect. In other words, the switching signal generation part 5 can select the voltage vectors based on at least one of the direction of one of the axial direction components in the two-axis coordinate system of the current command when the control command includes the current command, the direction of one of the axial direction components in the two-axis coordinate system of the voltage command, and the direction of one of the axial direction components in the two-axis coordinate system of the detected current (phase current) acquired by the phase current calculation part 8, thereby decreasing the power loss, which is an effect that has not hitherto been provided.

The power running and the regeneration are switched therebetween when the voltage vector remains normal, but the detection can be carried out in the power running mode by the switching based on the positive and negative of the q axis current.

According to this embodiment, the phase angle θβ to be considered is set to the range of from 0 degrees to 45 degrees or from 135 degrees to 180 degrees, but even when the range of the phase angle θβ to be considered is different, the two voltage vectors for bringing the mode into the power running mode in the power running operation state can be output by using the same method to select the two voltage vectors, thereby detecting the current to decrease the power loss.

When the amplitude Vmap of the voltage commands Vu, Vv, and Vw becomes more than a threshold set in advance, the two voltage vectors for the detection of the bus current may be selected based on the sequence in the magnitude of the voltage command. The selection of the two voltage vectors based on the sequence in the magnitude of the voltage command is equivalent to selection of the two voltage vectors neighboring the voltage command vector. Thus, the bus current is detected at a timing at which the voltage vectors neighbor the voltage command vector.

As a result, voltage vectors minimizing the power loss can be selected in a low modulation factor region where the voltage vectors can freely be selected, and necessary voltage vectors can be selected in a high modulation factor region where selectable combinations of the voltage vectors are limited, thereby suppressing the power loss at the high modulation factor.

Further, the power conversion device according to the present invention can be provided on an electric power steering so that the AC rotating machine 1 can generate a torque for assisting a steering torque of a steering system. As a result, there is provided such an effect that a steering system low in the power loss can be constructed. Moreover, a torque ripple can be suppressed on the electric power steering sensitive to vibration.

Figure 39:
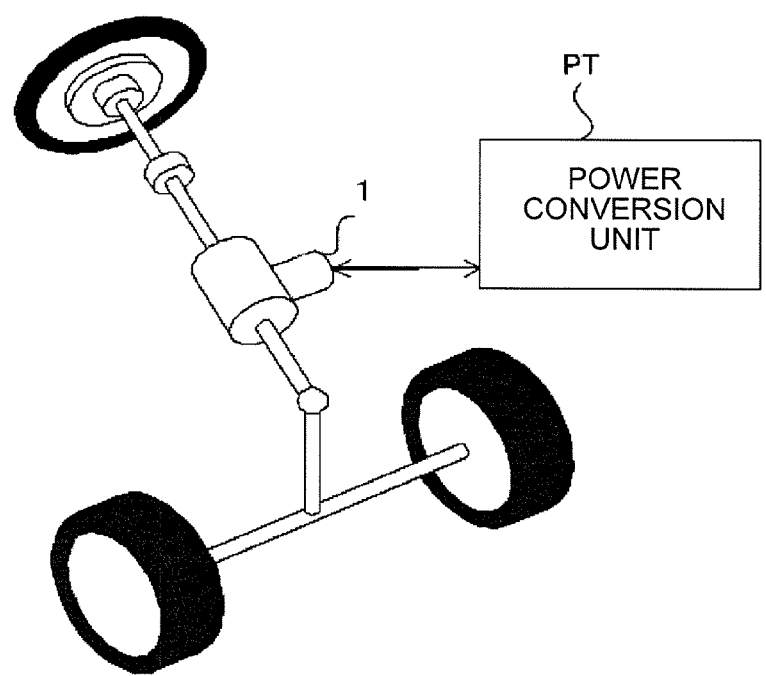
FIG. 39 is a diagram for illustrating an example of a configuration of a control device for an electric power steering for which the power conversion device according to the present invention is provided.

An example of a configuration of a control device for the electric power steering according to the present invention is schematically illustrated in FIG. 39. The AC rotating machine 1 is attached to a steering shaft so as to apply the assist torque, and a power conversion unit PT is constructed by portions other than the AC rotating machine 1 of FIG. 1, and the like.

Second Embodiment

According to the first embodiment, when the phase angle θβ is used in the predicted range, the effect of outputting the two voltage vectors for bringing the mode into the power running mode in the power running operation state to decrease the power loss, which has not hitherto been provided, is provided, but according to a second embodiment of the present invention, a description is given of a method of acquiring the same effect for an arbitrary phase angle θβ. The configuration of the power conversion device according to this embodiment is basically the same as that illustrated in FIG. 1.

Figure 33:
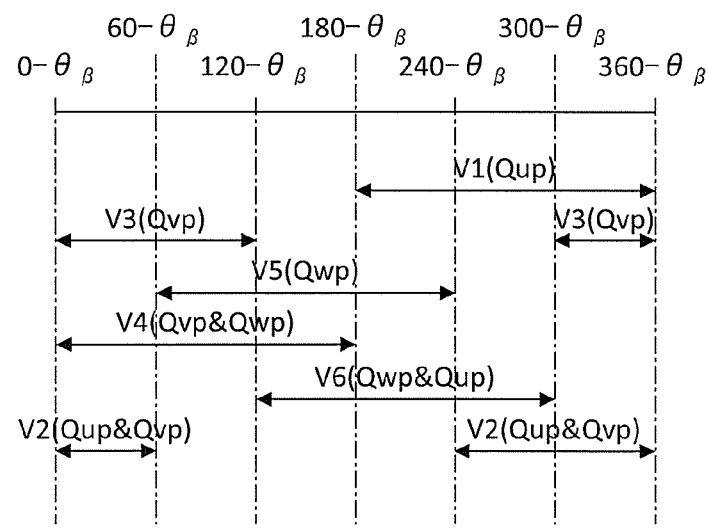
FIG. 33 is a diagram for illustrating possible setting ranges of the voltage vectors for outputting the two voltage vectors for bringing the mode into the power running mode in the power running operation state for an arbitrary phase angle θβ in the power conversion device according to a second embodiment of the present invention.

Possible setting ranges of the voltage vectors outputting the two voltage vectors for bringing the mode into the power running mode in the power running operation state for the phase angle θβ are illustrated in FIG. 33. The same effect is provided by shifting the switching angle of the combination of the two voltage vectors by an amount of the phase angle from the case where the phase angle θβ is 0 degrees.

For example, the two voltage vectors only need to be selected for an arbitrary phase angle θβ as illustrated in FIG. 34 and FIG. 35. FIG. 34 is a table for showing a case where the combination of the two voltage vectors is switched at the minimum electrical angle. FIG. 35 is a table for showing a case where the combination of the two voltage vectors is switched at the maximum electrical angle. The same effect as that of those two cases of outputting the two voltage vectors for bringing the mode into the power running mode in the power running operation state to decrease the power loss, which has not hitherto been provided, is acquired by selecting the two voltage vectors included in the possible setting ranges.

According to this embodiment, the phase angle θβ is described as the phase angle of the current vector, but the same effect is provided when the phase angle θβ is a phase angle in the two-axis coordinate system of the detected current (phase angle) acquired by the phase current calculation part 8, a phase angle in the two-axis coordinate system of the current command when the control command includes the current command, or a phase angle in the two-axis coordinate system of the voltage command.

For example, when a large d axis current flows (the phase angle is large), and the voltage vectors remain normal, a region in which the power running switches to the regeneration occurs, but the detection can be carried out in the power running mode by the switching in consideration of the phase angle of the current command.

Third Embodiment

Figure 36:
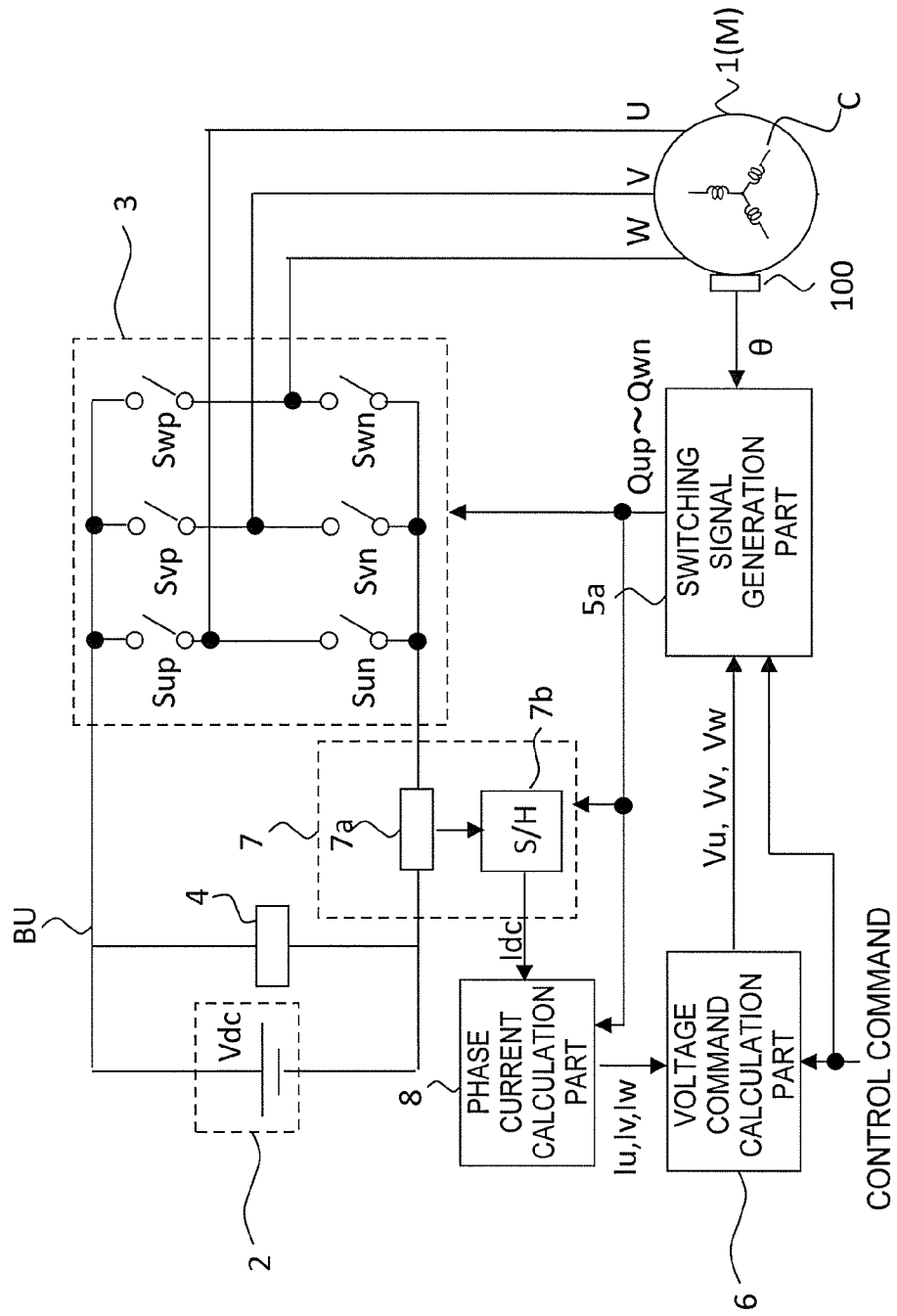
FIG. 36 is a diagram for illustrating an overall configuration of a power conversion device according to a third embodiment of the present invention.

FIG. 36 is a diagram for illustrating an overall configuration of the power conversion device according to a third embodiment of the present invention. The power conversion device according to the third embodiment of the present invention has almost the same overall configuration as that of FIG. 1, but is different in a point that a switching signal generation part 5a is configured to output the switching signals corresponding to the two voltage vectors for bringing the mode into the regeneration mode upon the current detection in the regeneration operation mode.

A description is now given of a difference in the bus current in accordance with the combination of the two voltage vectors for a case where Iu<Iv<0 and Iw>0 are satisfied while the AC rotating machine 1 is in the regeneration operation state.

Figure 37:
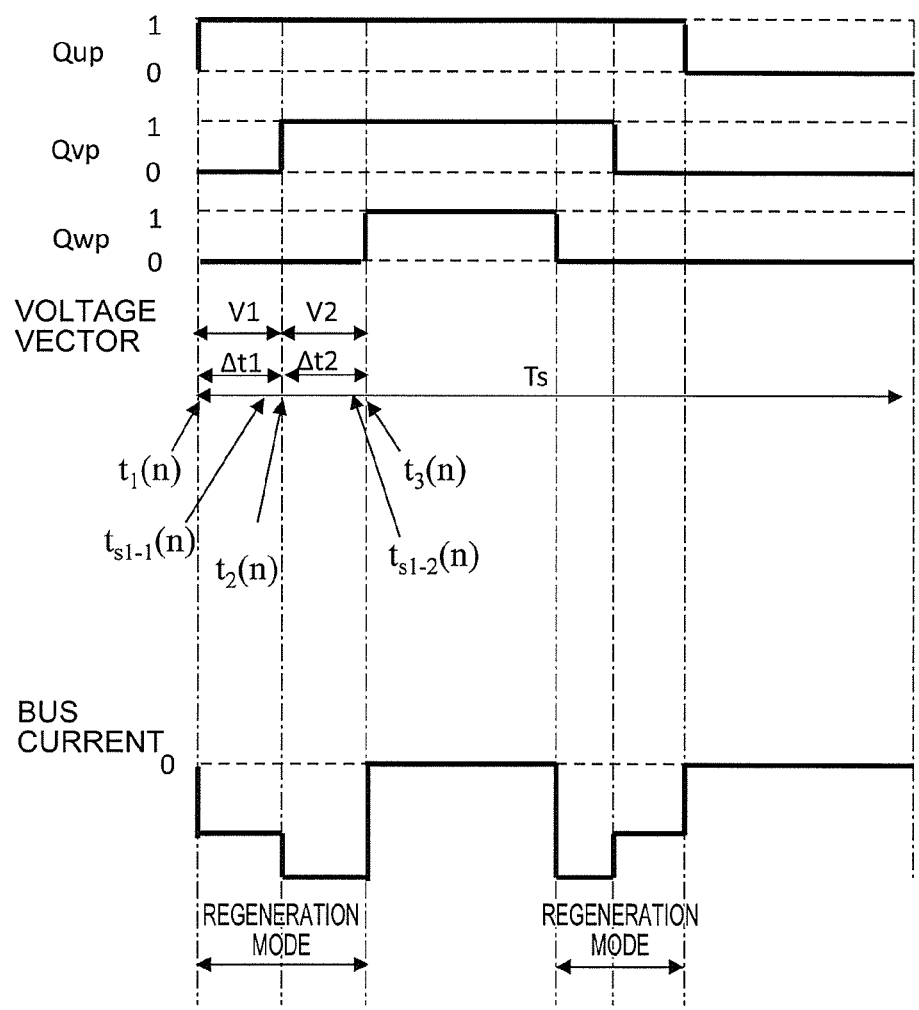
FIG. 37 is an operation explanatory diagram for illustrating an example of the switching signals in the switching signal generation part, the detection timings for the bus current in the current detection part, the voltage vectors, and the bus current in the power conversion device according to the third embodiment of the present invention.

In this embodiment, as illustrated in FIG. 37, when the two voltage vectors V1 and V2 are generated by setting Qup, Qvp, and Qwp to 1 in this sequence, the bus current Idc is detected during the generations of the voltage vectors. The sum of the three-phase currents is zero, and when any one of the three-phase currents has a different value, the current in least one phase thus has a positive value.

The bus current Idc detected at the time point ts1-1(n) is equal to the current Iu flowing through the U phase, the bus current Idc has a negative value, and the mode is in the regeneration mode in which the bus current Idc flows from the AC rotating machine 1 to the DC power supply 2 or the smoothing capacitor 4.

The bus current Idc detected at the time point ts1-2(n) is equal to the sign-inverted value −Iw flowing through the W phase, the bus current Idc has a positive value, and the mode is in the regeneration mode in which the bus current Idc flows from the AC rotating machine 1 to the DC power supply 2 or the smoothing capacitor 4.

Figure 38:
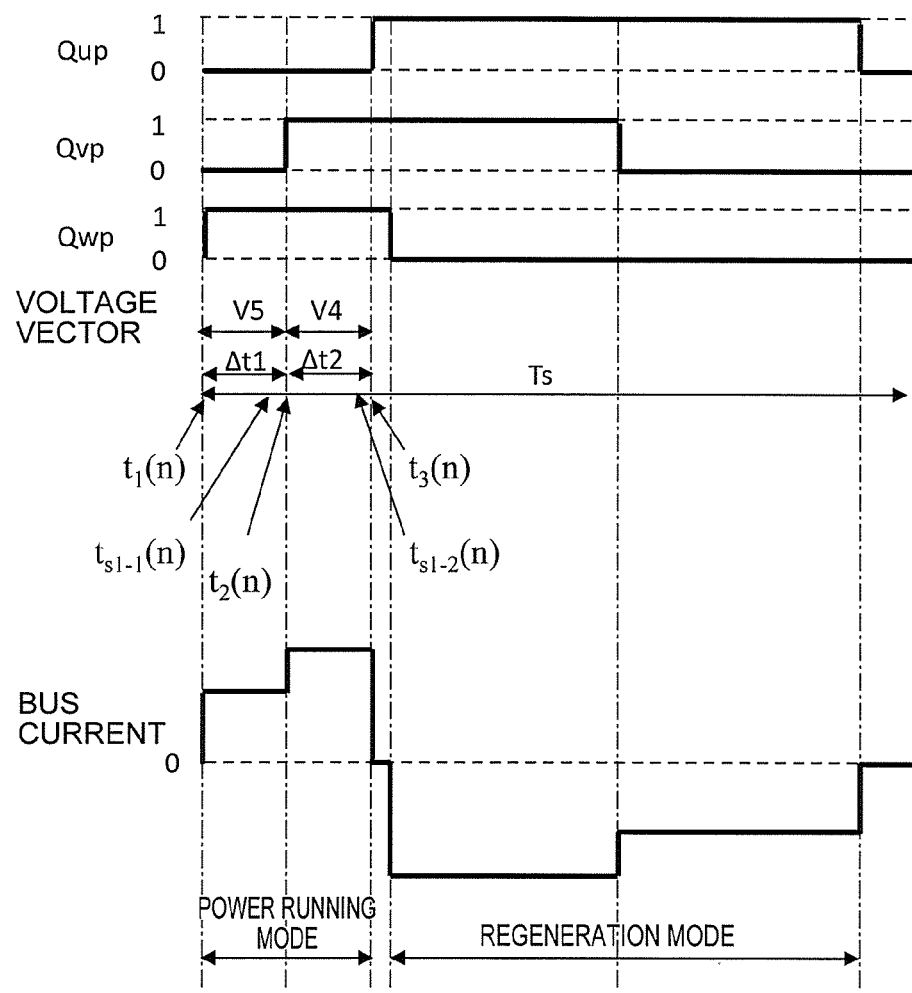
FIG. 38 is an operation explanatory diagram for illustrating a comparative example of FIG. 37.

FIG. 38 is a diagram for illustrating a comparative example of when the two voltage vectors V5 and V4 are generated by setting Qwp, Qvp, and Qup to 1 in this sequence, and the bus current Idc is detected during the generations of the voltage vectors.

The bus current Idc detected at the time point ts1-1(n) is equal to the current Iw flowing through the W phase, the bus current Idc has a positive value, and the mode is in the power running mode in which the bus current Idc flows from the DC power supply 2 or the smoothing capacitor 4 to the AC rotating machine 1.

The bus current Idc detected at the time point ts1-2(n) is equal to the sign-inverted value −Iu flowing through the U phase, the bus current Idc has a positive value, and the mode is in the power running mode in which the bus current Idc flows from the DC power supply 2 or the smoothing capacitor 4 to the AC rotating machine 1.

A power loss in the smoothing capacitor 4 is acquired by a product of the square of the bus current Idc and the equivalent serial resistance Rc. When the voltage vectors are selected as illustrated in FIG. 37, a power loss is generated in portions in the regeneration mode other than regions in which the voltage vector is V0 or V7. When the voltage vectors are selected as illustrated in FIG. 38, the period of the regeneration mode is increased by a period of the power running mode, a power loss is generated even in the power running mode, and a power loss increases when the voltage vectors, which bring the mode into the power running mode in the regeneration operation state, are selected.

Thus, according to the third embodiment, the switching signal generation part 5*a* is configured to output the switching signals corresponding to the two voltage vectors for bringing the mode into the regeneration mode upon the current detection in the regeneration operation mode, thereby providing an effect of decreasing the power loss, which has not hitherto been provided.

The method of outputting the switching signals corresponding to the two voltage vectors for bringing the mode into the regeneration mode upon the current detection in the regeneration operation mode only needs to be applied as in the first embodiment and the second embodiment.

In other words, the present invention is not limited to the respective embodiments, and the present invention includes all possible combinations thereof. For example, the control in the power running operation state according to the first embodiment and the control in the regeneration operation state according to the third embodiment may be switched therebetween in the respective operation states. Further, the control according to the second embodiment may be applied in the respective power running and regeneration operation states. Then, a control device for an electric power steering including a power conversion device having the above described respective functions may be constructed.

Moreover, according to the respective embodiments, a description is given of the example of the device for which the three-phase AC rotating machine is provided, but the present invention is not limited to the three phases, and can be applied to a device provided with an AC rotating machine having a multi-phase winding of four or more phases.

INDUSTRIAL APPLICABILITY

The power conversion device, and the like, according to the present invention can be applied to a power conversion device, and the like, in various fields.

REFERENCE SIGNS LIST

1 AC rotating machine, 2 DC power supply, 3 power conversion part,
4 smoothing capacitor, 5, 5*a* switching signal generation part,
6 voltage command calculation part, 7 current detection part,
7*a* shunt resistor,
7*b* sample-and-hold device, 8 phase current calculation part,
41 to 44 permanent magnet, 100 position detector, PT power conversion unit

The invention claimed is:
1. A power conversion device, comprising:
an AC rotating machine including a multi-phase winding of three or more phases;
a DC power supply part configured to output a DC voltage;
a voltage command calculation part configured to calculate a voltage command based on a control command from an outside for the AC rotating machine;
a switching signal generation part configured to output a switching signal corresponding to at least two voltage vectors corresponding to the voltage command;
a power conversion part configured to convert the DC voltage from the DC power supply part to an AC voltage based on the switching signal to supply the AC voltage to the AC rotating machine;
a current detection part configured to detect a bus current, which is a current flowing between the DC power supply part and the power conversion part; and
a phase current calculation part configured to calculate, based on the bus current, a phase current flowing through the multi-phase winding of the AC rotating machine, wherein:
the current detection part is configured to detect the bus current during a period at which the at least two voltage vectors are respectively output in accordance with the switching signal;
the switching signal generation part is configured to output a switching signal corresponding to a voltage vector for supplying a current from the DC power supply part to the AC rotating machine during the period at which the bus current is detected by the current detection part when the AC rotating machine is in a power running operation state; and the voltage command calculation part is configured to calculate the voltage command based on the calculated phase current input by the phase current calculation part, wherein the switching signal generation part is configured to select the voltage vector based on at least one of a phase angle in the two-axis coordinate system of the voltage command and a phase angle in the two-axis coordinate system of the phase current acquired by the phase current calculation part, and wherein the current detection part is configured to detect the bus current at a timing at which two voltage vectors neighboring a voltage command vector are set as the at least two voltage vectors when an amplitude of the voltage command is more than a threshold.

2. The power conversion device according to claim 1, wherein:

the power conversion part is configured to convert the DC voltage from the DC power supply part to an AC voltage based on the switching signal to supply the AC voltage to the AC rotating machine in the power running operation state, and to convert an electromotive force of the AC rotating machine into DC power to supply the DC power to the DC power supply part in a regeneration operation state; and the switching signal generation part is configured to output a switching signal corresponding to a voltage vector for supplying a current from the AC rotating machine to the DC power supply part during the period at which the bus current is detected by the current detection part when the AC rotating machine is in the regeneration operation state, and to output a switching signal corresponding to a voltage vector for supplying a current from the DC power supply part to the AC rotating machine during the period at which the bus current is detected by the current detection part when the AC rotating machine is in the power running operation state.

3. The power conversion device according to claim 2, wherein the switching signal generation part is further configured to select the voltage vector based on a phase angle in a two-axis coordinate system of a current command when the control command includes the current command.

4. The power conversion device according to claim 1, wherein the switching signal generation part is further configured to select the voltage vector based on a phase angle in a two-axis coordinate system of a current command when the control command includes the current command.

5. A control device for an electric power steering, comprising the power conversion device of claim 1 so that the AC rotating machine generates a torque for assisting a steering torque of a steering system.

6. A power conversion device, comprising:

an AC rotating machine including a multi-phase winding of three or more phases;

a DC power supply part configured to output a DC voltage;

a voltage command calculation part configured to calculate a voltage command based on a control command from an outside for the AC rotating machine;

a switching signal generation part configured to output a switching signal corresponding to at least two voltage vectors corresponding to the voltage command;

a power conversion part configured to convert an electromotive force of the AC rotating machine to a DC voltage based on the switching signal to supply the AC voltage to the AC rotating machine;

a current detection part configured to detect a bus current, which is a current flowing between the DC power supply part and the power conversion part; and a phase current calculation part configured to calculate, based on the bus current, a phase current flowing through the multi-phase winding of the AC rotating machine, wherein:

the current detection part is configured to detect the bus current at during a period at which the at least two voltage vectors are respectively output in accordance with the switching signal; and the switching signal generation part is configured to output a switching signal corresponding to a voltage vector for supplying a current from the AC rotating machine to the DC power supply part during the period at which the bus current is detected by the current detection part when the AC rotating machine is in a regeneration operation state, wherein the voltage command calculation part is further configured to calculate the voltage command based on the calculated phase current input by the phase current calculation part, wherein the switching signal generation part is configured to select the voltage vector based on at least one of a phase angle in the two-axis coordinate system of the voltage command and a phase angle in the two-axis coordinate system of the phase current acquired by the phase current calculation part, and wherein the current detection part is configured to detect the bus current at a timing at which two voltage vectors neighboring a voltage command vector are set as the at least two voltage vectors when an amplitude of the voltage command is more than a threshold.

7. The power conversion device according to claim 6, wherein:

the power conversion part is configured to convert the DC voltage from the DC power supply part to an AC voltage based on the switching signal to supply the AC voltage to the AC rotating machine in the power running operation state, and to convert an electromotive force of the AC rotating machine into DC power to supply the DC power to the DC power supply part in a regeneration operation state; and the switching signal generation part is configured to output a switching signal corresponding to a voltage vector for supplying a current from the AC rotating machine to the DC power supply part during the period at which the bus current is detected by the current detection part when the AC rotating machine is in the regeneration operation state, and to output a switching signal corresponding to a voltage vector for supplying a current from the DC power supply part to the AC rotating machine during the period at which the bus current is detected by the current detection part when the AC rotating machine is in the power running operation state.

8. The power conversion device according to claim 7, wherein the switching signal generation part is further configured to select the voltage vector based on a phase angle in a two-axis coordinate system of a current command when the control command includes the current command.

9. The power conversion device according to claim 6, wherein the switching signal generation part is further configured to select the voltage vector based on a phase angle in a two-axis coordinate system of a current command when the control command includes the current command.

10. A control device for an electric power steering, comprising the power conversion device of claim 6 so that the AC rotating machine generates a torque for assisting a steering torque of a steering system.

11. A control method for a power conversion device, the control method comprising:
calculating, by a voltage command calculation part, a voltage command based on a control command from an outside for an AC rotating machine including a multi-phase winding of three or more phases;
outputting, by a switching signal generation part, a switching signal corresponding to at least two voltage vectors corresponding to the voltage command;
converting, by a power conversion part, a DC voltage from a DC power supply part to an AC voltage based on the switching signal to supply the AC voltage to the AC rotating machine, and converting an electromotive force of the AC rotating machine into DC power to supply the DC power to the DC power supply part;
detecting, by a current detection part, a bus current, which is a current flowing between the DC power supply part and the power conversion part;
calculating, by a phase current calculation part, based on the bus current, a phase current flowing through the multi-phase winding of the AC rotating machine;
detecting, by the current detection part, the bus current during a period at which the at least two voltage vectors are respectively output in accordance with the switching signal; and
outputting, by the switching signal generation part, at least one of:
a switching signal corresponding to a voltage vector for supplying a current from the DC power supply part to the AC rotating machine during the period at which the bus current is detected by the current detection part when the AC rotating machine is in a power running operation state; and
a switching signal corresponding to a voltage vector for supplying a current from the AC rotating machine to the DC power supply part at a timing at which the bus current is detected by the current detection part when the AC rotating machine is in a regeneration operation state,
wherein the voltage command is calculated based on the calculated phase current, and
wherein the voltage vector is selected, by the switching signal generation part, based on at least one of a phase angle in the two-axis coordinate system of the voltage command and a phase angle in the two-axis coordinate system of the phase current acquired by the phase current calculation part, and
wherein the current detection part configured to detect the bus current at a timing at which two voltage vectors neighboring a voltage command vector are set as the at least two voltage vectors when an amplitude of the voltage command is more than a threshold.

12. A power conversion device, comprising:
an AC rotating machine including a multi-phase winding of three or more phases;
a DC power supply part configured to output a DC voltage;
a voltage command calculation part configured to calculate a voltage command based on a control command from an outside for the AC rotating machine;
a switching signal generation part configured to output a switching signal corresponding to at least two voltage vectors corresponding to the voltage command;
a power conversion part configured to convert the DC voltage from the DC power supply part to an AC voltage based on the switching signal to supply the AC voltage to the AC rotating machine;
a current detection part configured to detect a bus current, which is a current flowing between the DC power supply part and the power conversion part; and
a phase current calculation part configured to calculate, based on the bus current, a phase current flowing through the multi-phase winding of the AC rotating machine, wherein:
the current detection part is configured to detect the bus current during a period at which the at least two voltage vectors are respectively output in accordance with the switching signal;
the switching signal generation part is configured to output a switching signal corresponding to a voltage vector for supplying a current from the DC power supply part to the AC rotating machine during the period at which the bus current is detected by the current detection part when the AC rotating machine is in a power running operation state; and
the voltage command calculation part is configured to calculate the voltage command based on the calculated phase current input by the phase current calculation part,
wherein the switching signal generation part is configured to select the voltage vector based on at least one of a direction of one of axial direction components in the two-axis coordinate system of the voltage command, and a direction of one of axial direction components in the two-axis coordinate system of the phase current acquired by the phase current calculation part.

13. The power conversion device according to claim 12, wherein:
the power conversion part is configured to convert the DC voltage from the DC power supply part to an AC voltage based on the switching signal to supply the AC voltage to the AC rotating machine in the power running operation state, and to convert an electromotive force of the AC rotating machine into DC power to supply the DC power to the DC power supply part in a regeneration operation state; and
the switching signal generation part is configured to output a switching signal corresponding to a voltage vector for supplying a current from the AC rotating machine to the DC power supply part during the period at which the bus current is detected by the current detection part when the AC rotating machine is in the regeneration operation state, and to output a switching signal corresponding to a voltage vector for supplying a current from the DC power supply part to the AC rotating machine during the period at which the bus current is detected by the current detection part when the AC rotating machine is in the power running operation state.

14. The power conversion device according to claim 13, wherein the switching signal generation part is further configured to select the voltage vector based on a direction of one of axial direction components in a two-axis coordinate system of a current command when the control command includes the current command.

15. The power conversion device according to claim 12, wherein the switching signal generation part is further configured to select the voltage vector based on a direction of one of axial direction components in a two-axis coordinate system of a current command when the control command includes the current command.

16. A power conversion device, comprising:
   an AC rotating machine including a multi-phase winding of three or more phases;
   a DC power supply part configured to output a DC voltage;
   a voltage command calculation part configured to calculate a voltage command based on a control command from an outside for the AC rotating machine;
   a switching signal generation part configured to output a switching signal corresponding to at least two voltage vectors corresponding to the voltage command;
   a power conversion part configured to convert an electromotive force of the AC rotating machine to a DC voltage based on the switching signal to supply the AC voltage to the AC rotating machine;
   a current detection part configured to detect a bus current, which is a current flowing between the DC power supply part and the power conversion part; and
   a phase current calculation part configured to calculate, based on the bus current, a phase current flowing through the multi-phase winding of the AC rotating machine, wherein:
   the current detection part is configured to detect the bus current at during a period at which the at least two voltage vectors are respectively output in accordance with the switching signal; and
   the switching signal generation part is configured to output a switching signal corresponding to a voltage vector for supplying a current from the AC rotating machine to the DC power supply part during the period at which the bus current is detected by the current detection part when the AC rotating machine is in a regeneration operation state,
   wherein the voltage command calculation part is further configured to calculate the voltage command based on the calculated phase current input by the phase current calculation part,
   wherein the switching signal generation part is configured to select the voltage vector based on at least one of a direction of one of axial direction components in the two-axis coordinate system of the voltage command, and a direction of one of axial direction components in the two-axis coordinate system of the phase current acquired by the phase current calculation part.

17. The power conversion device according to claim 16, wherein:
   the power conversion part is configured to convert the DC voltage from the DC power supply part to an AC voltage based on the switching signal to supply the AC voltage to the AC rotating machine in the power running operation state, and to convert an electromotive force of the AC rotating machine into DC power to supply the DC power to the DC power supply part in a regeneration operation state; and
   the switching signal generation part is configured to output a switching signal corresponding to a voltage vector for supplying a current from the AC rotating machine to the DC power supply part during the period at which the bus current is detected by the current detection part when the AC rotating machine is in the regeneration operation state, and to output a switching signal corresponding to a voltage vector for supplying a current from the DC power supply part to the AC rotating machine during the period at which the bus current is detected by the current detection part when the AC rotating machine is in the power running operation state.

18. The power conversion device according to claim 17, wherein the switching signal generation part is further configured to select the voltage vector based on a direction of one of axial direction components in a two-axis coordinate system of a current command when the control command includes the current command.

19. The power conversion device according to claim 16, wherein the switching signal generation part is further configured to select the voltage vector based on a direction of one of axial direction components in a two-axis coordinate system of a current command when the control command includes the current command.

* * * * *